(12) United States Patent
Claflin et al.

(10) Patent No.: US 10,000,287 B2
(45) Date of Patent: Jun. 19, 2018

(54) DROP DOWN OVERHEAD GALLEY STOWAGE SYSTEM

(71) Applicant: B/E Aerospace, Inc., Wellington, FL (US)

(72) Inventors: Shawn A. Claflin, Seattle, WA (US); Robert Papke, Camano Island, WA (US); James B. Hauser, Mukilteo, WA (US); Jefferey McKee, Duvall, WA (US)

(73) Assignee: B/E Aerospace, Inc., Wellington, FL (US)

( * ) Notice: Subject to any disclaimer, the term of this patent is extended or adjusted under 35 U.S.C. 154(b) by 154 days.

(21) Appl. No.: 15/191,326

(22) Filed: Jun. 23, 2016

(65) Prior Publication Data
US 2017/0001726 A1   Jan. 5, 2017

Related U.S. Application Data

(60) Provisional application No. 62/188,460, filed on Jul. 2, 2015.

(51) Int. Cl.
*B64D 11/00* (2006.01)
*B64D 11/04* (2006.01)
(Continued)

(52) U.S. Cl.
CPC ............ *B64D 11/003* (2013.01); *B64D 11/04* (2013.01); *B64D 47/02* (2013.01); *E05C 1/085* (2013.01);
(Continued)

(58) Field of Classification Search
CPC .............................. B64D 11/003; B64D 11/04
See application file for complete search history.

(56) References Cited

U.S. PATENT DOCUMENTS

| | | | | |
|---|---|---|---|---|
| 5,441,218 A * | 8/1995 | Mueller | ............... | B64D 11/003 244/118.1 |
| 5,934,615 A * | 8/1999 | Treichler | ............. | B64D 11/003 244/118.5 |
| 6,598,829 B2 * | 7/2003 | Kamstra | ............. | B64D 11/003 244/118.1 |
| 6,899,299 B2 * | 5/2005 | Ritts | .................... | B64D 11/003 244/118.5 |
| 6,971,608 B2 * | 12/2005 | Harrington | ........ | B64D 11/0007 244/118.5 |
| 7,159,821 B2 * | 1/2007 | Harrington | ........ | B64D 11/0007 244/118.5 |

(Continued)

FOREIGN PATENT DOCUMENTS

| | | |
|---|---|---|
| EP | 1 249 392 A1 | 10/2002 |
| EP | 1 281 614 A1 | 2/2003 |
| FR | 2 947 243 A1 | 12/2010 |

OTHER PUBLICATIONS

PCT Search Report and Written Opinion issued in related application PCT/US2016/038980, dated Sep. 9, 2016, 10 pages.

*Primary Examiner* — Philip J Bonzell
*Assistant Examiner* — Michael B Kreiner
(74) *Attorney, Agent, or Firm* — Drinker Biddle & Reath LLP

(57) ABSTRACT

An aircraft overhead stowage system for a cross-aisle galley complex. The aircraft overhead stowage system includes a stowage compartment housing disposed above a ceiling of the galley complex that is supported above the ceiling by a stowage support structure. A first stowage compartment and a second stowage compartment are each movably engaged with and disposed inside the stowage compartment housing, and each stowage compartment is movable between a stowed position and a deployed position relative to the stowage compartment housing using a vacuum system. A vacuum generator that creates a vacuum force is mounted on the stowage compartment housing, and a plurality of vacuum bellows connected to each stowage compartment are in fluid communication with the vacuum generator. The vacuum system causes the stowage compartments to move between the stowed position and the deployed position. Vacuum-driven and manually-driven latching assemblies (Continued)

and removable extensions for each stowage compartment are also provided.

15 Claims, 22 Drawing Sheets

(51) Int. Cl.
  *B64D 47/02* (2006.01)
  *E05C 1/08* (2006.01)
  *E05C 9/10* (2006.01)
  *F04B 45/053* (2006.01)

(52) U.S. Cl.
  CPC ............ *E05C 9/10* (2013.01); *F04B 45/0536* (2013.01); *Y02T 50/46* (2013.01)

(56) References Cited

U.S. PATENT DOCUMENTS

| | | | |
|---|---|---|---|
| 7,494,091 B2 * | 2/2009 | Harrington | B64D 11/0007 212/312 |
| 7,712,704 B2 * | 5/2010 | Saint-Jalmes | B64D 11/00 244/118.5 |
| 7,726,606 B2 * | 6/2010 | Graf | B64D 11/003 244/118.5 |
| 8,636,249 B2 * | 1/2014 | Conen | B64D 11/003 244/118.1 |
| 9,051,051 B1 * | 6/2015 | Biedscheid | B64D 11/003 |
| 9,435,360 B2 * | 9/2016 | Claflin | B64D 11/00 |
| 2004/0016847 A1 | 1/2004 | Rills | |
| 2018/0016009 A1 * | 1/2018 | Burd | B64D 11/00 |

* cited by examiner

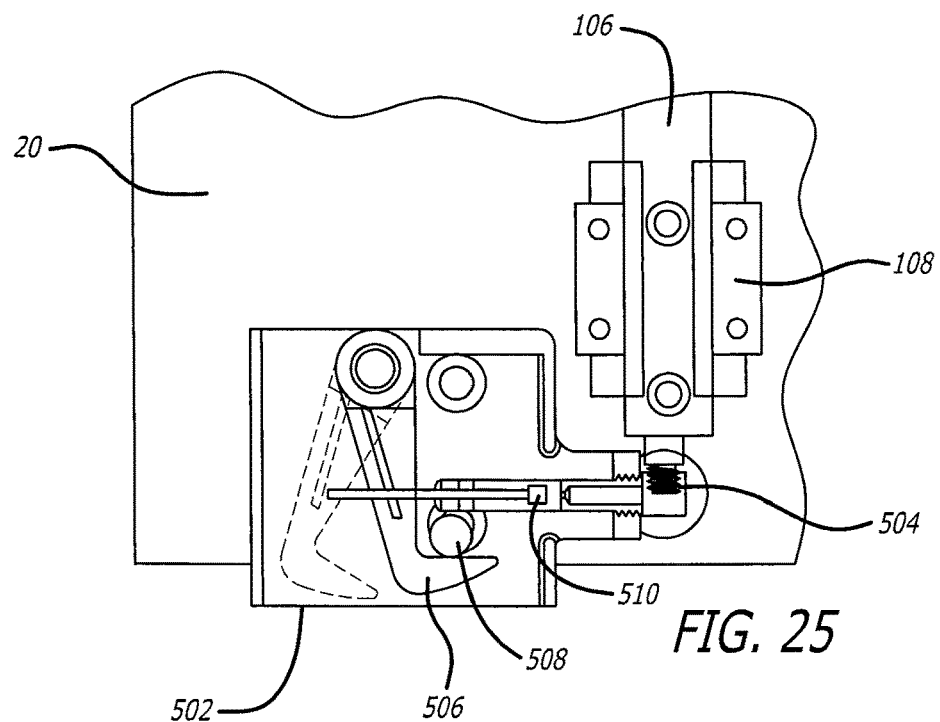
FIG. 25
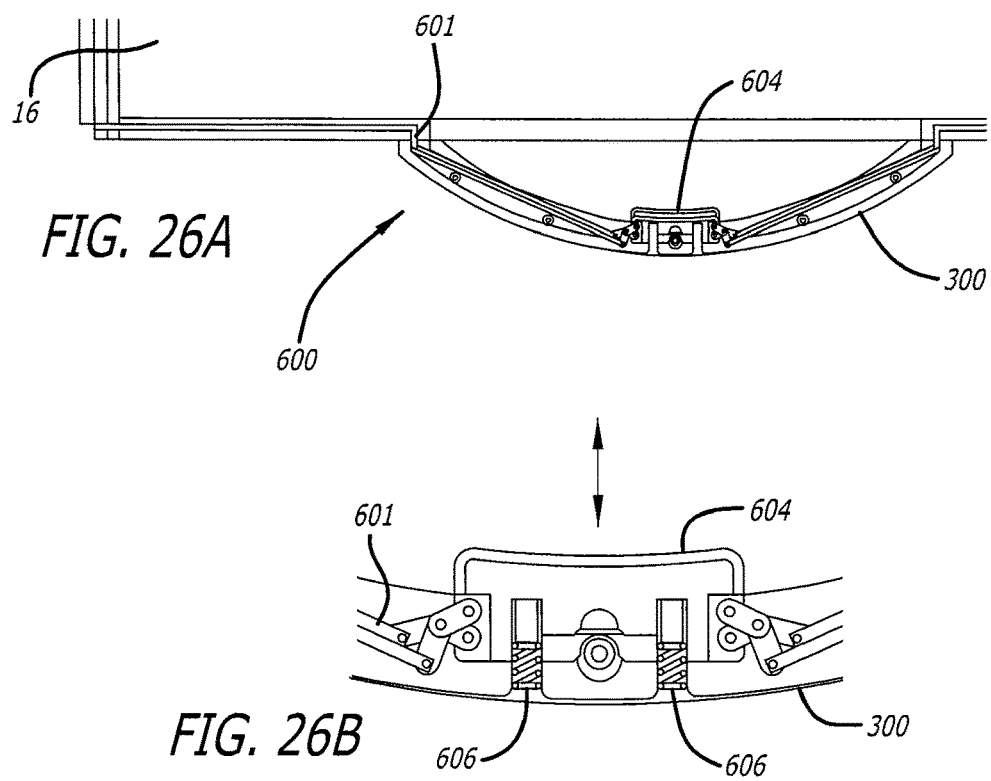
FIG. 26A
FIG. 26B

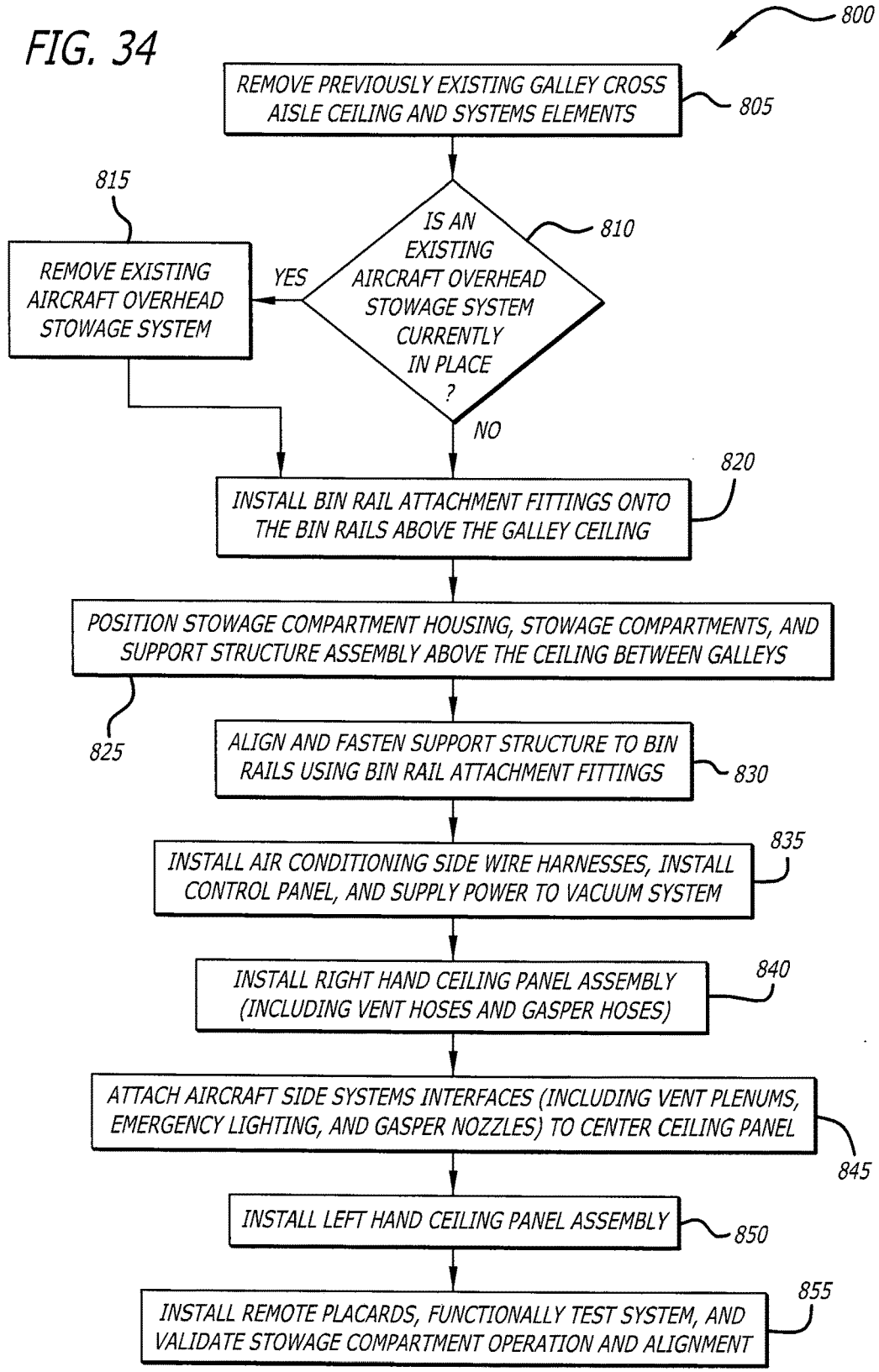

DROP DOWN OVERHEAD GALLEY STOWAGE SYSTEM

CROSS-REFERENCES TO RELATED APPLICATIONS

This application claims priority from U.S. Provisional Application No. 62/188,460, filed Jul. 2, 2015, incorporated by reference in its entirety.

BACKGROUND

The present invention relates generally to storage systems, and more specifically relates to an overhead stowage system for a center aisle galley complex in an aircraft.

Airlines are continuously searching for additional stowage options as fleets increase passenger count and main deck space becomes more valuable for revenue generation. In addition, the Federal Aviation Administration (FAA) requires that airlines provide storage for passenger wheelchairs which are accessible within the main cabin, specifically for immediate retrieval upon passenger debarkation.

Galley complexes located in a cross-aisle section of the center of an aircraft are possible places for storing or stowing ancillary items or other passenger and crew member items. However, currently existing stowage solutions take up substantial weight and give limited volume for stowage space. Moreover, the FAA requires that cross-aisles have a minimum unimpeded width at all times, currently approximately 21 inches, to allow for emergency egress of passengers and crew members from the aircraft. Yet, currently existing cross-aisle stowage systems in a cross-aisle center galley complex can block the path of the cross-aisle in the event of a system failure, thus compromising cabin safety criteria.

Hence, it is desirable to have an aircraft stowage system that is lighter in weight, does not impede cross-aisle access when actuated, and has a larger overall volume than currently existing solutions. It is also desirable to have an aircraft stowage system that can be utilized while passengers are loading and disembarking the aircraft. The present invention meets these and other needs.

SUMMARY OF THE INVENTION

The present invention provides a means of stowing ancillary items without impacting the main cabin environment. The present invention utilizes space in the aircraft overhead (crown) area that is free of aircraft structure or systems in the cross aisle between galleys. By taking advantage of this space, a large volume of stowage can be incorporated that is easily accessible to the cabin crew when deployed and does not impact the main cabin footprint or passenger space. This provides aircraft operators with much needed storage capability that would otherwise require cabin closet/galley or passenger overhead stowage bin compartments to be used.

According to a presently preferred embodiment, the aircraft overhead stowage system uses two mirrored stowage compartments for each galley complex, and a stand-alone vacuum pressure drive system to actuate the stowage compartments. The stowage compartments are preferably 49 inches wide by 16 inches deep by 37 inches high, and the volume of each compartment is preferably 16.7 cubic feet, or 33.4 cubic feet in total. When a single stowage compartment is in the lowered position, a full FAA-compliant cross-aisle width of 21 or more inches is provided allowing for passenger and cabin crew member cross travel. The aircraft overhead stowage system also provisions for all required overhead galley systems including new LED work lights.

Accordingly, there is provided an aircraft overhead stowage system for a cross-aisle galley complex. The aircraft overhead stowage system includes a stowage compartment housing disposed above a ceiling of the galley complex that is supported above the ceiling by a stowage support structure. A first stowage compartment and a second stowage compartment are each movably engaged with and disposed inside the stowage compartment housing, and each stowage compartment is movable between a stowed position and a deployed position relative to the stowage compartment housing.

The aircraft overhead stowage system further includes a vacuum system. The vacuum system includes a vacuum generator that creates a vacuum force and is mounted on the stowage compartment housing, and a plurality of vacuum bellows connected to each stowage compartment and in fluid communication with the vacuum generator. Each of the vacuum bellows contracts in response to a negative pressure caused by the vacuum force, and each of the vacuum bellows expands in response to a venting of the negative pressure caused by the vacuum force.

A control panel is provided in electrical communication with the vacuum generator, and the control panel is configured to activate the vacuum system to move either the first stowage compartment or the second stowage compartment between their stowed positions and their deployed positions.

Furthermore, the aircraft overhead stowage system includes a galley ceiling system including a ceiling systems panel positioned on the ceiling of the galley complex between the first stowage compartment and the second stowage compartment. The ceiling systems panel includes aircraft side systems interfaces including one or more galley vent plenums for venting the galley complex, one or more gasper nozzles for supplying air to the galley complex, and one or more emergency lighting devices. The galley ceiling system further includes a first ceiling panel (or right-hand ceiling panel) and a second ceiling panel (or left-hand ceiling panel) adjacent to the center ceiling system panel. The right-hand ceiling panel preferably includes flex hoses for connecting the aircraft side systems interfaces to the existing ventilation ducts and air passageways extending throughout the aircraft.

In a preferred aspect, the stowage support structure that supports the stowage compartment housing includes a plurality of C-shaped extrusions, a plurality of lateral channels connected orthogonally to the C-shaped extrusions using gussets, a plurality of tie rods that connect the stowage compartment housing to one of the C-shaped extrusions, a plurality of bin support rail fittings configured to be placed on a plurality of bin support rails, and a plurality of clevis fittings each having a bolt that connects each bin support rail to each C-shaped extrusion.

In another preferred aspect, there is provided a retractable extension that is removably attached to either the first stowage compartment or the second stowage compartment. The retractable extension can be used to stow larger items in each stowage compartment, such as coats, jackets, or wheelchairs.

In another preferred aspect, the aircraft overhead stowage system includes a linear track rail system. Each stowage compartment includes a pair of linear track rails connected to a side of the stowage compartment for moving each stowage compartment between their stowed positions and their deployed positions. Moreover, the stowage compartment housing includes low profile rail bearings fixed to the stowage compartment housing that slidably engage the linear track rails of each stowage compartment. These low profile rail bearings guide movement of each stowage compartment between their stowed positions and their deployed positions.

In another preferred aspect, a handle is positioned on a bottom side of each stowage compartment for pulling down each stowage compartment.

In another preferred aspect, the vacuum system further includes a plurality of bypass valves in fluid communication with the vacuum generator and with each of the vacuum bellows. The control panel is electrically connected to each bypass valve, and each bypass valve is selectively configured to prevent the vacuum force from contacting the vacuum bellows in response to an electrical signal transmitted by the control panel.

In another preferred aspect, the control panel is positioned accessibly to the user on an aisle galley in the galley complex.

In another preferred aspect, the galley ceiling system includes a vent plenum disposed on the ceiling systems panel that is in fluid communication with a ventilation duct for venting the galley complex, a gasper nozzle positioned on the ceiling systems panel adjacent to the vent plenum that is in fluid communication with an air passageway for supplying air to the galley complex, an emergency lighting positioned on the ceiling systems panel adjacent to the vent plenum opposite the gasper nozzle, and a plurality of galley work lights positioned on the ceiling systems panel adjacent to the first stowage compartment and to the second stowage compartment.

In another preferred aspect, the ceiling systems panel is hingedly rotatable to provide access to a chiller disposed within one of the first stowage compartment and the second stowage compartment.

In another preferred aspect, there is provided a vacuum-driven latching mechanism including a latch strike assembly connected to each stowage compartment. Each latch strike assembly includes a latch pin, a locking strike that removably engages the latch pin, and a pressure piston in fluid communication with the vacuum generator. The locking strike of the first stowage compartment prevents the first stowage compartment from moving into the deployed position while the locking strike engages the latch pin of the first stowage compartment. Additionally, the pressure piston of the first stowage compartment disengages the locking strike of the first stowage compartment from the latch pin in response to activation of the vacuum system by the control panel, thereby allowing the first stowage compartment to move into the deployed position.

In another preferred aspect, there is provided a manually-operated handle latch mechanism inside the handle of each stowage compartment that includes a latch connected to the stowage compartment, a latch bolt assembly including a latch bolt that removably engages the latch to prevent the stowage compartment from descending into the deployed position, a spring mechanism inside the handle that is connected to the latch bolt assembly, and a push button disposed on the handle that engages the spring mechanism.

In a preferred aspect, when the push button is pressed, the spring mechanism compresses and causes the latch bolt to disengage from the latch to allow the stowage compartment to move into the deployed position. When the push button is released, the spring mechanism expands and causes the latch bolt to re-engage the latch to lock the stowage compartment in the stowed position.

In another preferred aspect, isolation mounts are connected to the stowage compartment housing, and the vacuum generator is attached to the isolation mounts using a bracket to reduce generation of noise by the vacuum generator.

In another preferred aspect, there is provided a method of installing an aircraft overhead stowage system for a cross-aisle galley complex, including removing previously existing galley cross-aisle ceiling and systems elements from the ceiling of the galley complex, installing a plurality of bin support rail fittings onto a plurality of bin support rails disposed above the ceiling of the galley complex, positioning a stowage compartment housing supported by a stowage support structure above the ceiling of the galley complex, in which the stowage compartment housing includes a first stowage compartment and a second stowage compartment each movably engaged with and disposed inside the stowage compartment housing and movable between a stowed position and a deployed position relative to the stowage compartment housing, aligning the stowage compartment housing and the stowage support structure with the bin support rails, fastening the stowage support structure to the bin support rails using the bin support rail fittings such that the stowage compartment housing is structurally supported above the ceiling of the galley complex, installing a control panel in a selected location accessible to a cabin crew member and electrically connecting the control panel to the vacuum generator and to the bypass valves, where the control panel is configured to activate the vacuum system to move one of the first stowage compartment and the second stowage compartment between their stowed positions and their deployed positions, and installing a galley ceiling system onto the ceiling of the galley complex.

In a preferred aspect, the step of installing a galley ceiling system includes installing a first ceiling panel on the ceiling of the galley complex below the stowage compartment housing, where the first ceiling panel includes attached ceiling-mounted flex hoses for connecting to a ventilation duct and to an air passageway disposed above the ceiling of the galley complex, attaching aircraft side systems interfaces including a vent plenum, a gasper nozzle, and emergency lighting to a center ceiling systems panel, installing the center ceiling systems panel with attached aircraft side systems interfaces into the ceiling of the galley complex below the stowage compartment housing and adjacent to the first ceiling panel, and installing a second ceiling panel on the ceiling of the galley complex below the stowage compartment housing and adjacent to the center ceiling systems panel.

In another preferred aspect, the step of installing the galley ceiling system further includes attaching a plurality of interface duct plenums to a bin support rail, connecting a first galley venting hose and a first gasper hose to the interface duct plenums, further connecting the first galley venting hose to a ventilation duct, further connecting the first gasper hose to an air passageway, further attaching a plurality of ceiling mounted flex hoses integrated on the right hand ceiling panel, including a second galley venting hose and a second gasper hose, to the interface duct plenums, further connecting the second galley venting hose to the vent plenum, and further connecting the second gasper hose to the gasper nozzle.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 25 is a side elevational view of the latch strike assembly illustrated in FIG. 24.

FIG. 26A is a side elevational view of a manual latch assembly in a handle for a stowage compartment in the aircraft overhead stowage system, where the handle has been made transparent for clarity of illustration.

FIG. 26B is an enlarged view of the handle of FIG. 26A.

FIG. 34 is a schematic diagram of a method of installing the aircraft overhead stowage system into the ceiling of a cross-aisle galley complex.

DETAILED DESCRIPTION OF THE PREFERRED EMBODIMENTS

The present invention addresses the desire for airlines to increase stowage capacity without compromising aircraft cabin space. The system provides a means to store miscellaneous items in a compartment that utilizes the available free volume in the overhead area or crown of the aircraft. The stowage compartments are designed to be housed in a remote compartment above the height of the galley ceiling and to be automatically lowered or deployed into the center aisle space between galleys, providing access for loading of many different items. When loading is complete, the stowage compartments can then be automatically retracted into a stowed position above the ceiling.

The present invention allows for a full FAA-compliant cross aisle width if the stowage compartment is deployed or inoperative in the lowered position. Unlike the prior art, the system does not compromise cabin safety criteria for emergency egress if the lift system fails, and is a substantial weight reduction to currently existing systems. The present invention further assists airlines in optimizing cabin volumes for increased stowage capacity and/or passenger count or improved seating pitch due to reduced closet footprint requirements in the main cabin.

In general, the above ceiling overhead stowage units include two independent stowage compartments contained in a single structural housing located between center aircraft galleys above the ceiling. The stowage assembly attaches to the structure of the aircraft for structural support. The housing consists of a composite container that incorporates guide tracks, load bearing elements, and a vacuum actuation mechanism utilized for lowering and lifting/stowing the individual stowage compartments. The stowage compartments are mechanically retained in the retracted (stowed) position. A control panel located within the galley provides logic for actuation of the system.

Preferably, each stowage compartment functions independently, allowing for only a single unit to be deployed in the lowered position at any given time. This feature is intended to provide the FAA required cross aisle width for egress, and full access to the compartment for cabin personnel.

The stowage compartments are designed to accommodate a variety of stowage requirements discretionary to the airline operator. The aircraft overhead stowage system includes multiple, customizable insert features that are capable of being quickly installed into and removed from the stowage compartments to encompass stowage of various options, including, but not limited to: pillows, blankets, mattress pads; standard galley containers; full-sized passenger wheelchairs; aircraft wheelchairs; ATA roller bags (cabin crew or PAX), coats/jackets, duty free items, beverages for a bar or beverage service, miscellaneous galley items, and customer discretionary items.

Figure 1:
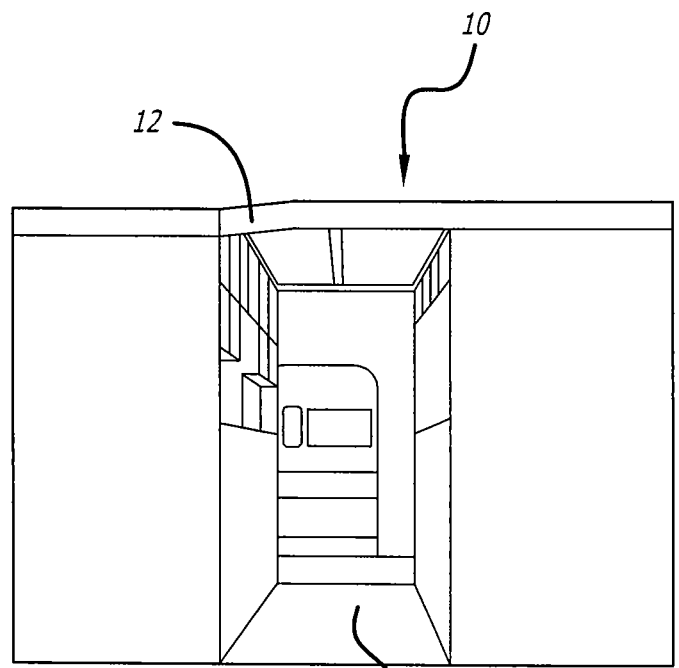
FIG. 1 is a perspective view of a cross-aisle center galley complex of an aircraft incorporating the aircraft overhead stowage system of the present invention.
Figure 2:
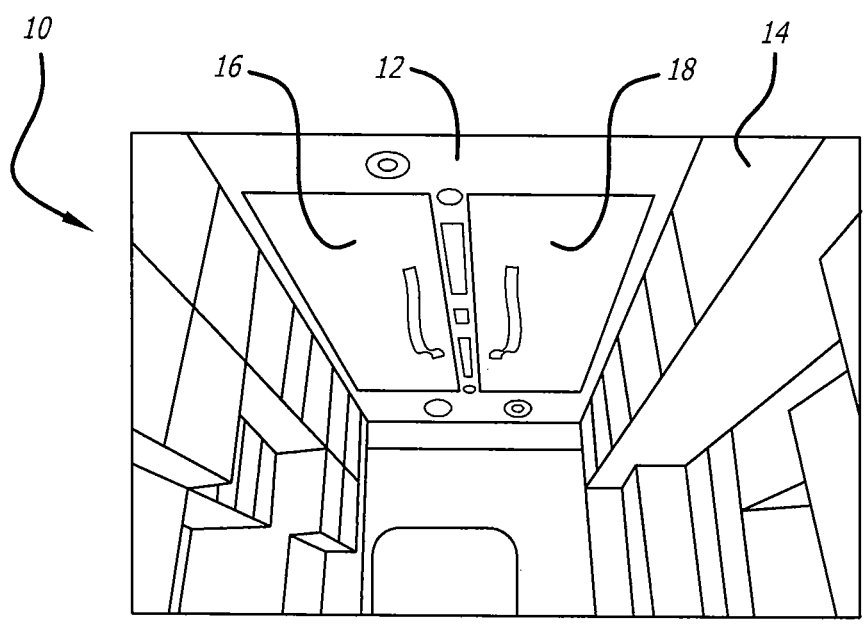
FIG. 2 is a perspective view of the cross-aisle center galley complex shown in FIG. 1 in which a preferred embodiment of the aircraft overhead stowage system is installed into the ceiling of the center galley complex.

A preferred embodiment of the aircraft overhead stowage system of the present invention is illustrated in FIGS. 1-7B. Referring to FIGS. 1 and 2, an aircraft overhead stowage system 10 is provided above the ceiling 12 of a cross-aisle center galley complex 14 of an aircraft. The aircraft overhead stowage system 10 generally includes a forward stowage compartment 16 and an aft or rear stowage compartment 18. As previously mentioned, the stowage compartments 16, 18 can be individually lowered into the galley complex 14 for stowing and accessing stowed items within.

Figure 3:
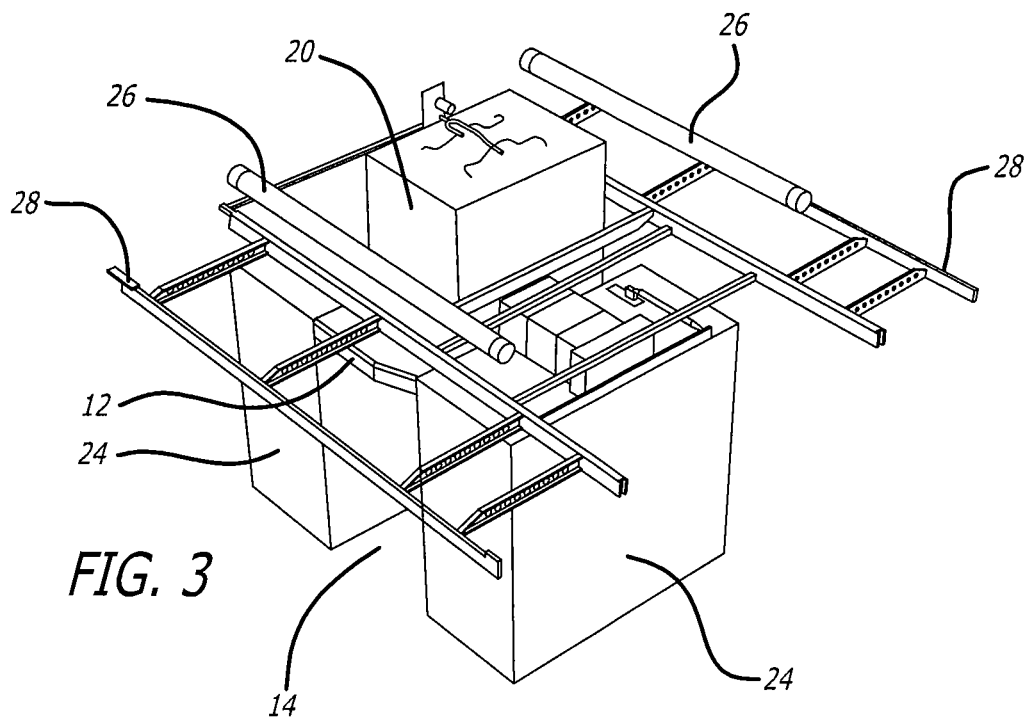
FIG. 3 is a perspective view of a cross-aisle center galley complex of an aircraft incorporating a preferred embodiment of the aircraft overhead stowage system among existing above-ceiling aircraft structure.
Figure 4:
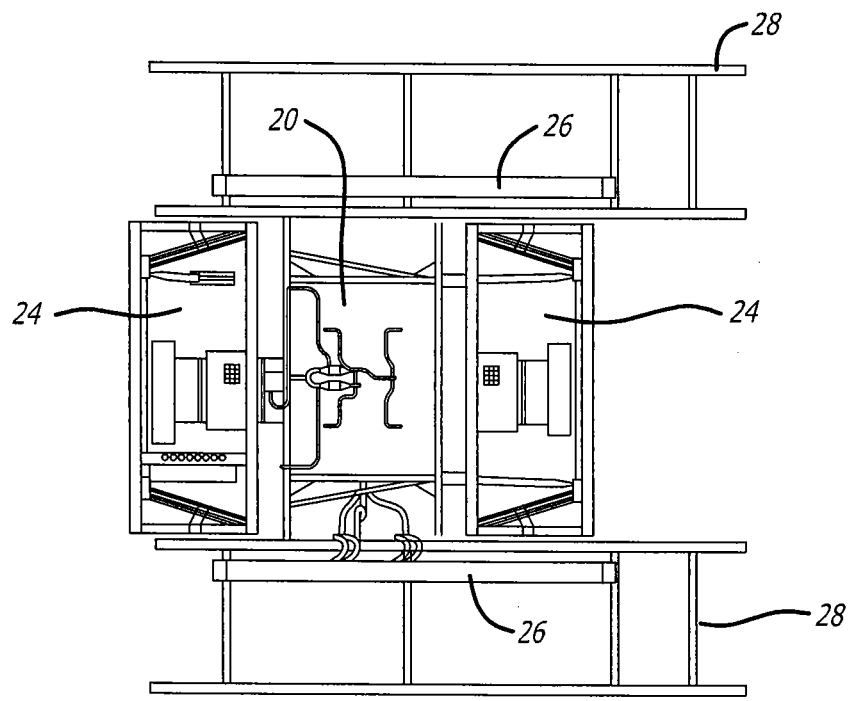
FIG. 4 is a top plan view of the cross-aisle center galley complex including the installed aircraft overhead stowage system depicted in FIG. 3.

As can be seen in FIGS. 3-4, the stowage compartments 16, 18 are stowed above the ceiling 12 of galley complex 14 in a structural stowage compartment housing 20 or support. The stowage compartment housing 20 is disposed above the ceiling in the available free area of the aircraft between the existing aircraft structures, including above-ceiling galley structures on top of each aisle galley 24, ventilation ducts 26, and bin support rails 28. A galley chiller (not shown) may also be stowed on top of the ceiling 12.

Figure 5:
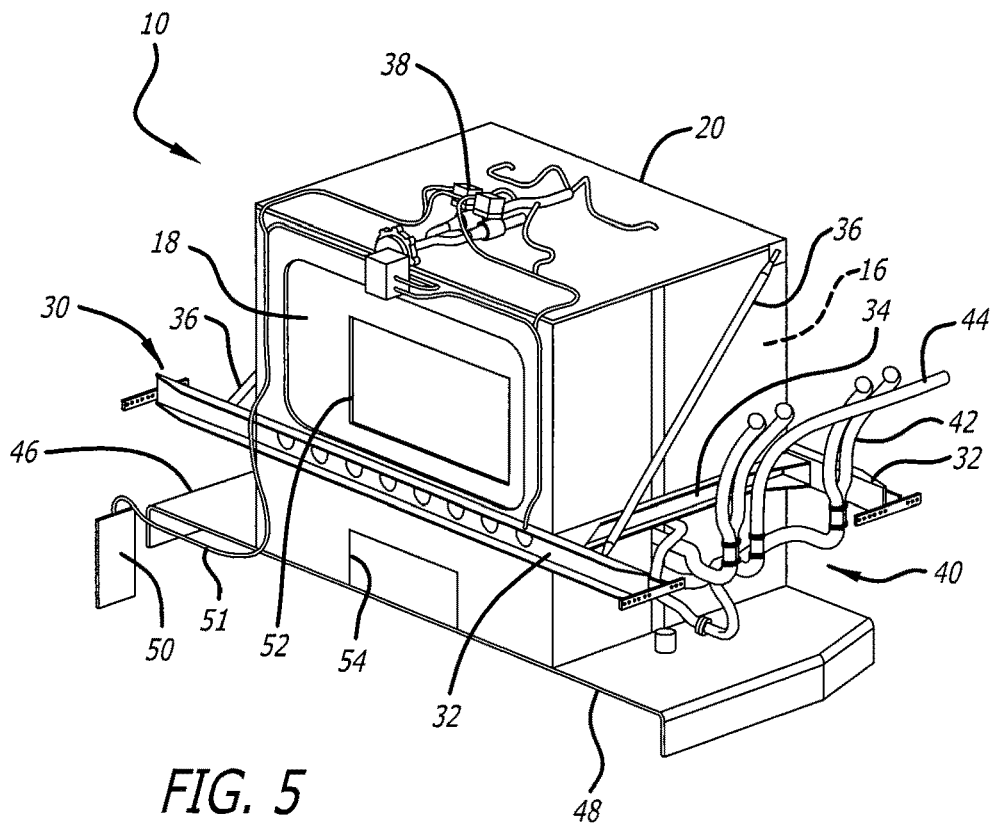
FIG. 5 is a perspective view of an aircraft overhead stowage system according to a preferred embodiment of the present invention including front and rear stowage compartments disposed in a stowage compartment housing.
Figure 6:
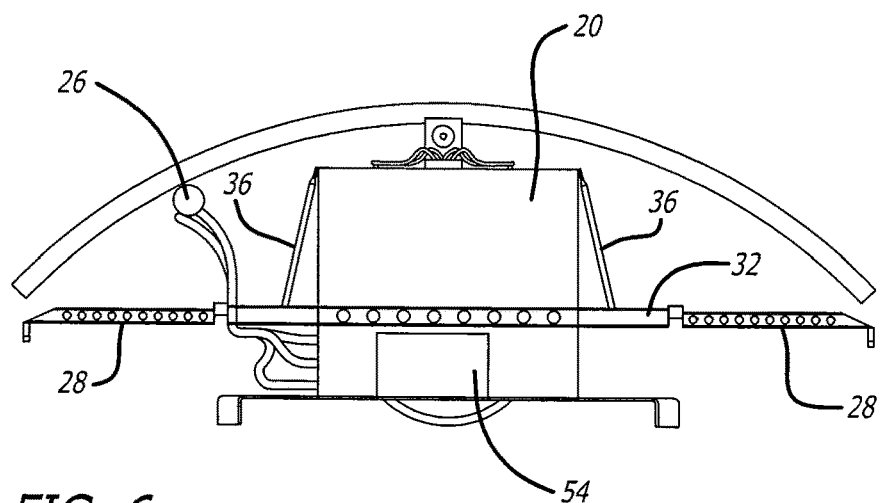
FIG. 6 is a front side elevational view of the aircraft overhead stowage system shown in FIG. 5 as installed above the ceiling of the cross-aisle center galley complex.

FIGS. 5 and 6 illustrate the aircraft overhead stowage system 10 in its uninstalled and installed configurations, respectively. As indicated in FIG. 5, the stowage compartment housing 20 contains stowage compartments 16 and 18 and is supported by a stowage support structure 30 above the ceiling of the center galley complex 14. The stowage support structure partly includes "C"-shaped or "C" channel extrusions 32 connecting the stowage compartment housing to the aircraft's existing bin support rails 28 (see FIG. 6), lateral channels 34 connecting to both "C" channel extrusions, and tie rods 36 connecting the stowage compartment housing to one of the "C"-shaped extrusions.

Furthermore, a vacuum system 38 is disposed on the stowage compartment housing 20. The vacuum system operates to raise and lower the stowage compartments 16, 18 below the ceiling 12 into the center galley complex 14. A galley ceiling system 40 is further included that includes galley venting hoses 42 and gasper air hoses 44 which respectively connect to existing ventilation ducts 26 and air passageways (not shown) for venting and controlling air from and to the center galley complex. Left-hand ceiling panel 46 and right-hand ceiling panel 48, as well as a control panel 50, are also included in the aircraft overhead stowage system 10. Additionally, each stowage compartment includes a compartment opening 52 (see FIG. 5) through which a galley chiller stored on top of the galley ceiling can be accessed through a housing opening 54 (see FIG. 6) in the stowage compartment housing 20.

Figure 7A:
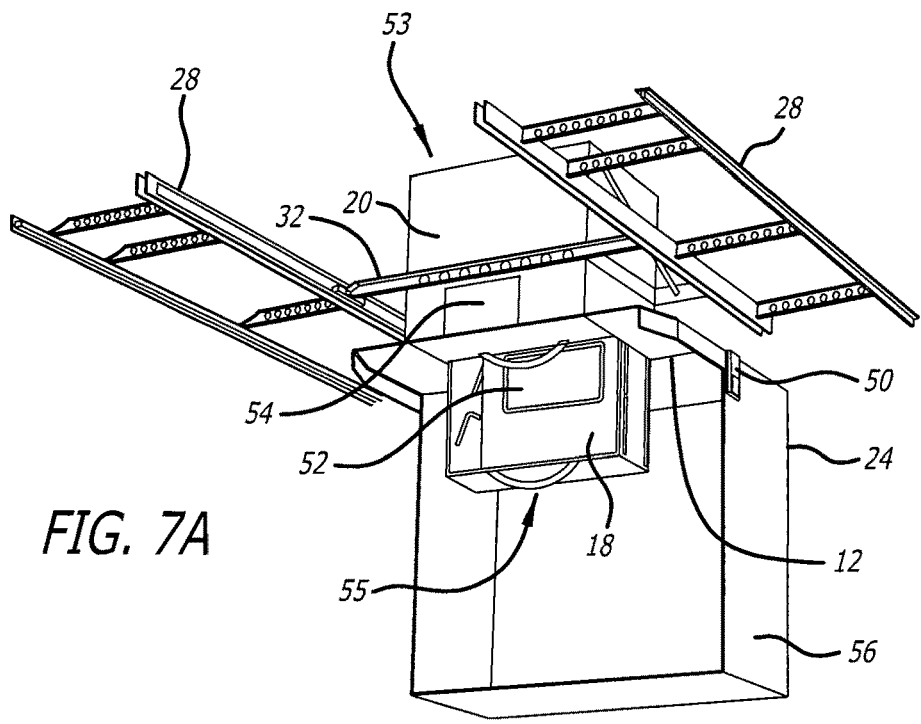
FIG. 7A is a perspective view of a preferred embodiment of the aircraft overhead stowage system in which one of the aisle galleys has been removed for clarity to illustrate deployment of the rear stowage compartment into the cross-aisle center galley complex using a control panel attached to the rear aisle galley.
Figure 7B:
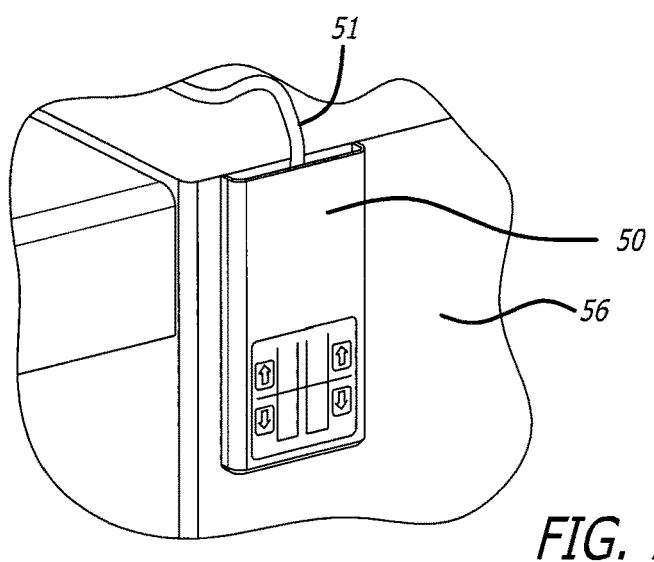
FIG. 7B is an enlarged perspective view of the control panel referenced in FIG. 7A.

Referring now to FIGS. 7A and 7B, the control panel 50 is preferably attached to the side of an aisle galley 24, or in any other accessible location, for controlling the stowage and deployment of the stowage compartments 16, 18. The control panel operates the system by allowing a cabin crew member to raise either stowage compartment into a stowed position 53 above the ceiling 12, or to lower either stowage compartment into a lowered or deployed position 55 below the ceiling to be accessible for loading items. The control panel 50 is preferably located in a position allowing for easy access to the cabin crew that is remote from the path of movement for the stowage compartments 16, 18. In one preferred aspect, the control panel is located on the aisle face 56 of the galley complex 14, allowing for ease of wire harness 51 routing and maintaining the control of the aircraft overhead stowage system 10 within the work area of the galley complex 14.

Figure 8:
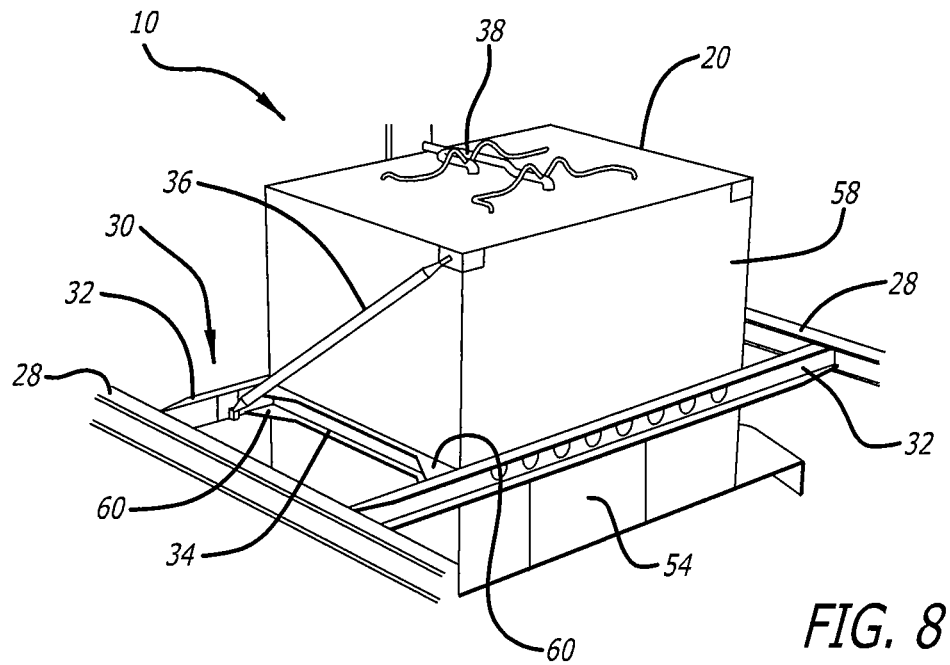
FIG. 8 is a left side perspective view of the aircraft overhead stowage system including a stowage support structure that supports the stowage compartment housing.
Figure 9A:
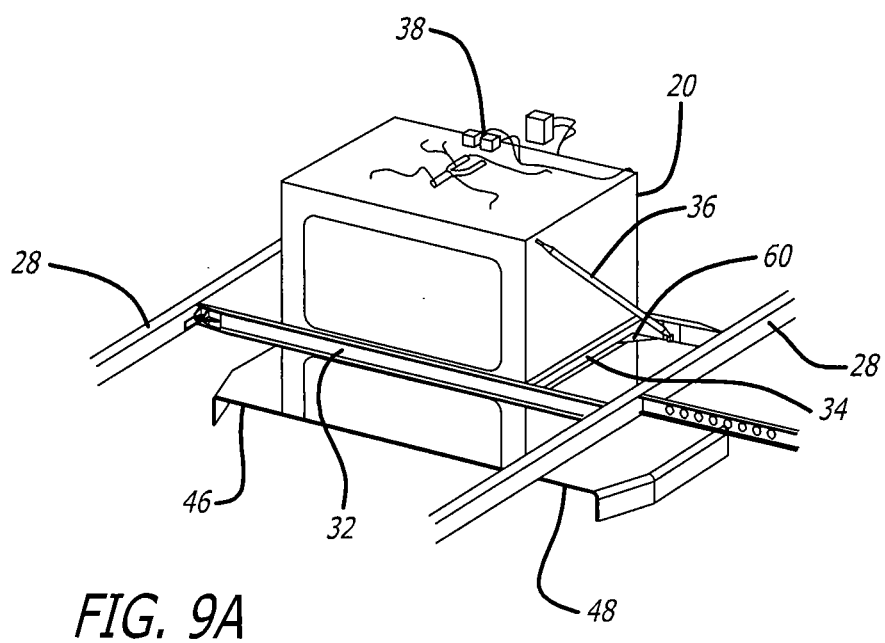
FIG. 9A is a right side perspective view of the aircraft overhead stowage system with stowage support structure illustrated in FIG. 8.
Figure 9B:
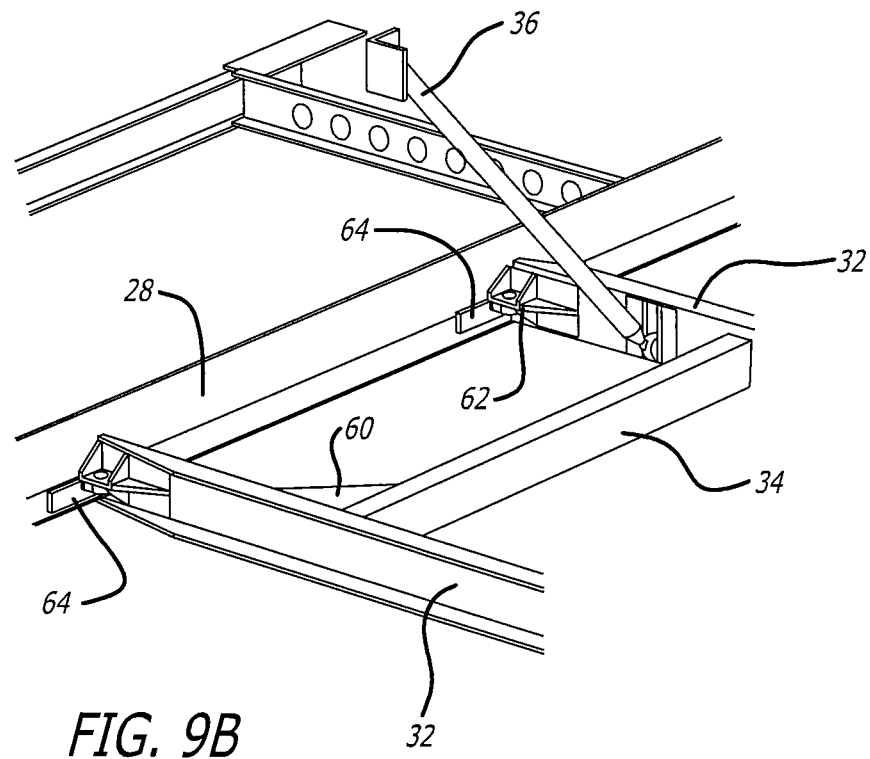
FIG. 9B is a partial perspective view of the stowage support structure illustrated in FIG. 9A in which the stowage compartment housing has been removed for clarity to illustrate various components of the stowage support structure and their connection to existing bin support rails in the aircraft.
Figure 9C:
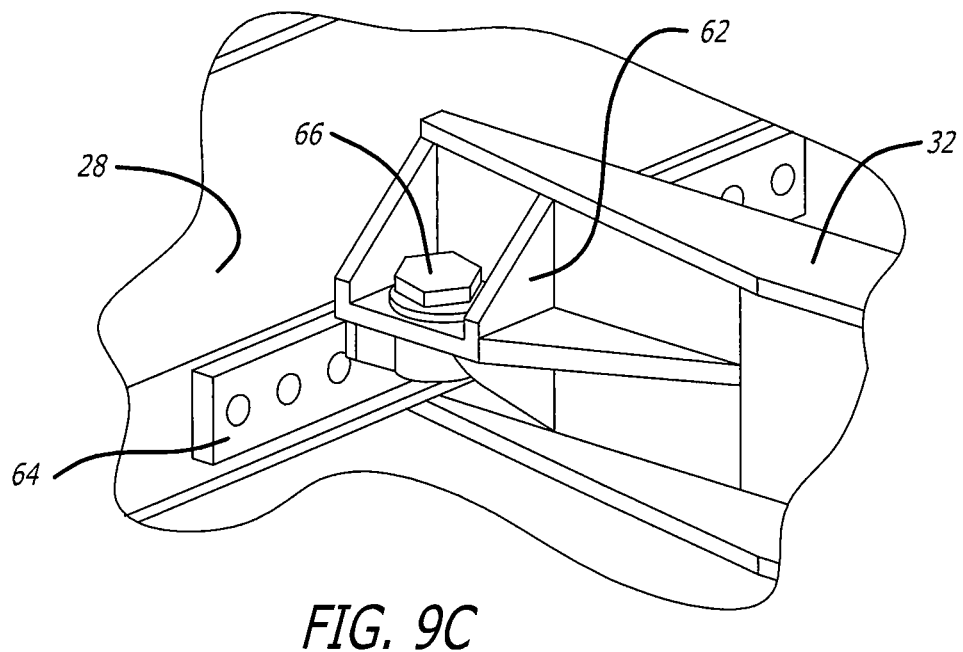
FIG. 9C is an enlarged perspective view of the various components referenced in FIG. 9B that are used to connect the stowage support structure to the existing bin support rails.

FIGS. 8-9C illustrate a preferred embodiment of the stowage support structure 30 for the stowage compartment housing 20. As shown in FIG. 8, the stowage support structure 30 includes "C"-shaped or "C" channel extrusions 32 intersecting with lateral channels 34 both connected to the stowage compartment housing 20, tie rods 36 (preferably 9 g tie rods) that connect the top-left and top-right corners of the front face 58 of the stowage compartment housing to the rear C-shaped extrusion, and gussets 60 further connecting the "C" channel extrusions to the lateral channels. Moreover, as shown in FIGS. 9B-9C, to connect the "C" channel extrusions to the bin support rails 28, the stowage support structure 30 further includes integrated clevis fittings or interface fittings 62 connected to the "C" channel extrusions that mate with bin support rail fittings 64 attached to the bin support rails 28. The "C" channel extrusions are preferably connected to the existing opposite bin support rails using four bin support rail fittings, and a fastener 66 such as a bolt secures the "C" channel extrusions to the bin support rails.

The stowage compartment housing 20 distributes flight loads to the existing bin support rails 28 via the "C" channel extrusions 32 and integrated clevis fittings or interface fittings 62. The four mating bin support rail fittings 64, two on each bin support rail, are attached to the bin support rails via existing holes in the rails 28. The interface fittings are pinned to the bin support rail fittings using the fasteners 66, each preferably a 0.4375-20 bolt. The stowage compartment housing and compartments 16, 18 are in this way supported via the stowage support structure 30 including, the C channel extrusions and the lateral channels 34 fixed to the housing, and the gussets 60 that connect the C channel extrusions to the lateral channels. The stowage support structure assembly thus creates a structural frame which supports the stowage box housing 20 and the vacuum system 38. Additionally, the two diagonal tie rods 36 translate moment loads from the upper forward corners of the housing into the structural frame and out to the bin support rails.

In a preferred aspect, the stowage compartment housing 20 and the stowage compartments 16 and 18 are manufactured from 5012-2-0500 panels using a mortis and tenon joint construction method. The primary structural support framework of the stowage support structure 30 preferably includes aluminum extruded channels (32, 34), tie rods 36, formed sheet metal and machined clevis fittings 62.

Figure 10:
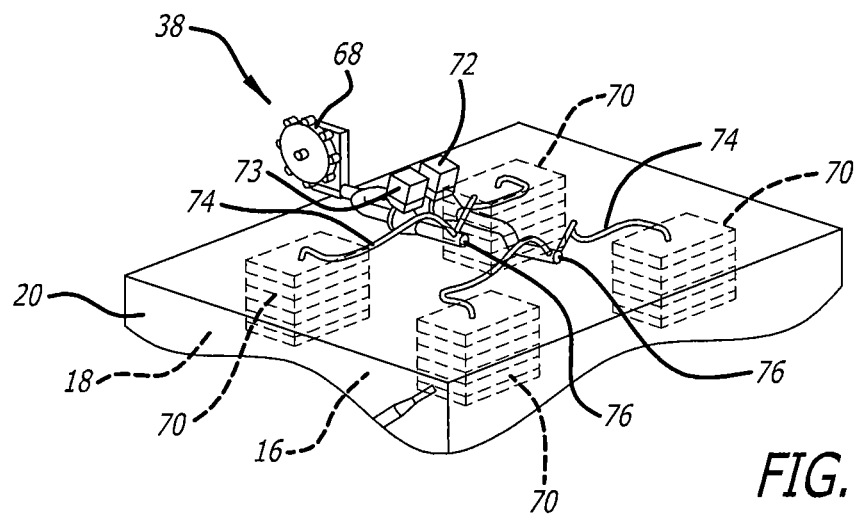
FIG. 10 is a perspective view of a vacuum system in the aircraft overhead stowage system that uses a vacuum generator to operatively move the stowage compartments in the stowage compartment housing.
Figure 11:
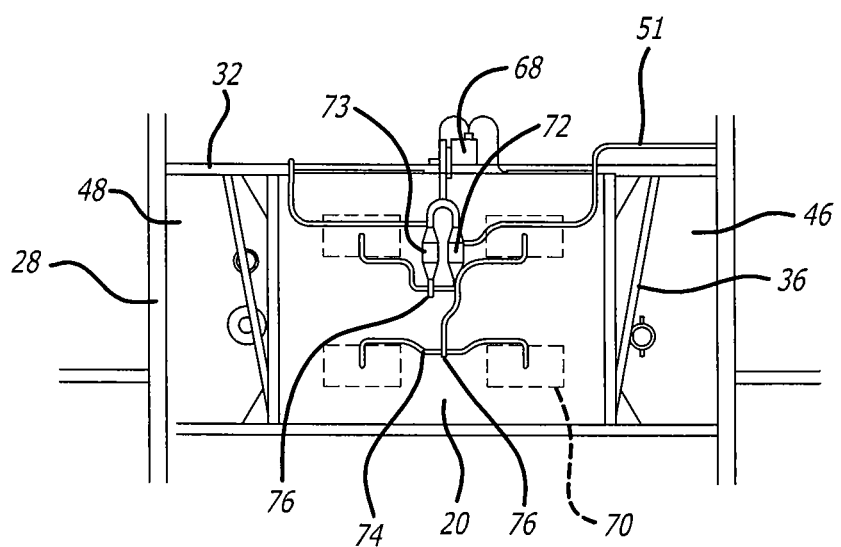
FIG. 11 is a top plan view of the vacuum system illustrated in FIG. 10.

FIGS. 10-14 illustrate a preferred embodiment of the vacuum system 38. As shown in FIGS. 10 and 11, the vacuum system 38 is disposed above the stowage compartment housing 20 for raising and lowering the stowage compartments 16, 18. The vacuum system serves a primarily load bearing function. The vacuum system includes a vacuum generator 68 that supplies a vacuum force to a pair of bellows 70 connected to each stowage compartment via a first bypass valve 72 and a second bypass valve 73. The vacuum force causes the bellows to contract when applied, lifting the stowage compartment, and expand when released or vented, lowering the stowage compartment. Ducting or bellows lines 74 connecting the vacuum generator to the bellows are preferably rigid and flexible. Vacuum plenums or manifolds 76 direct the vacuum force to the bellows.

Figure 13:
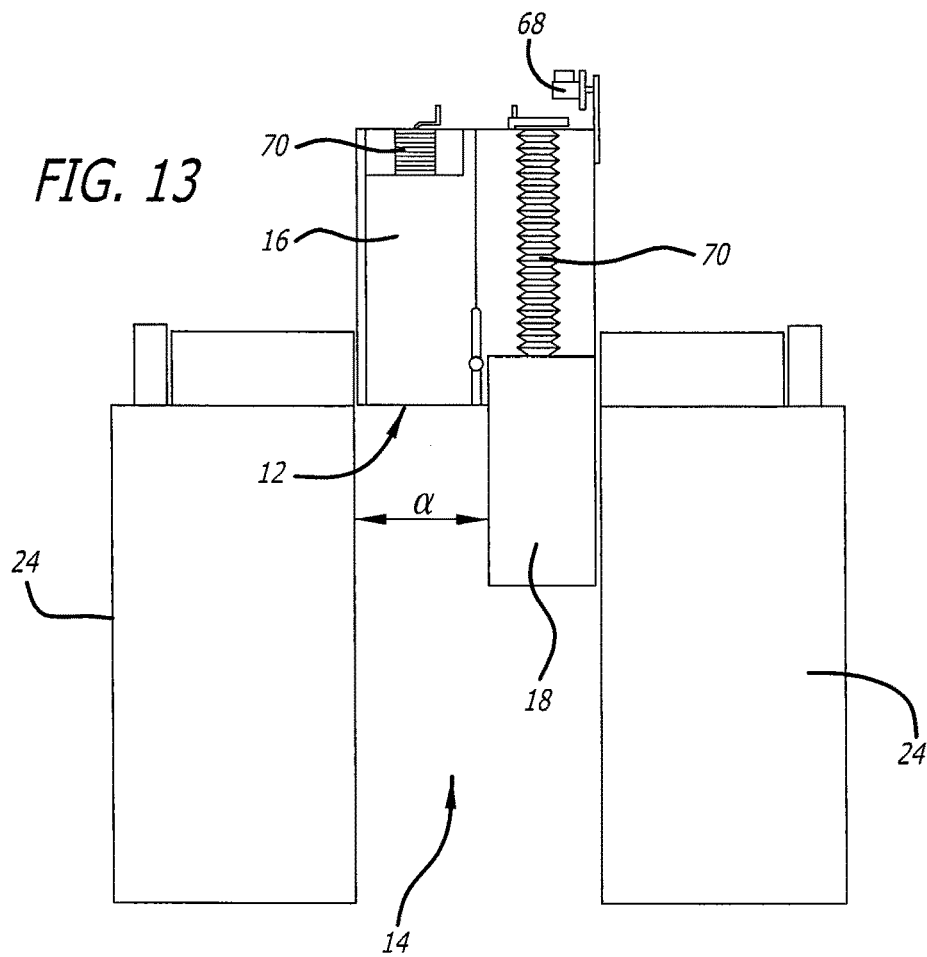
FIG. 13 is a side elevational view of the aircraft overhead stowage system where one of the two stowage compartments is stowed above the ceiling and the other has been deployed below the ceiling into the cross-aisle center galley complex using the vacuum system and air bellows referenced in FIG. 12.

The bypass valves 72, 73 direct the vacuum force to either stowage compartment 16, 18, respectively, in response to electrical signals transmitted by operation of the control panel 50 to the bypass valves such as through wire harness 51 (see FIG. 11). For example, when a user activates the control panel to deploy or stow the front stowage compartment 16, the control panel causes the bypass valve 72 for that stowage compartment to activate, allowing the corresponding bellows 70 connected to that stowage compartment to lift or lower the stowage compartment in response to the vacuum force caused by the vacuum generator 68. Meanwhile, the control panel causes the other bypass valve 73 to deactivate by blocking and preventing the vacuum force from reaching the bellows connected to the other stowage compartment 18. Similarly, the control panel can be used to deploy or stow the rear stowage compartment and block vacuum force to the front stowage compartment. As a result, the aircraft overhead stowage system 10 preferably allows only one bypass valve 72, 73 to be active at a time, thereby allowing only one stowage compartment to be deployed at a time. Therefore, when one stowage compartment is fully deployed in the galley complex 14 using the vacuum system 38 while the other stowage compartment is stowed, as illustrated in FIG. 13, the cross-aisle distance is sufficiently wide to comply with FAA cross-aisle width requirements. For example, when one stowage compartment is lowered using the vacuum system while the other stowage compartment is stowed, the cross-aisle distance a between the aisle galley 24 and the deployed stowage compartment is preferably 21.8 inches, complying with FAA requirements. The stowage compartments can be lowered preferably to 52.5 inches above the aircraft floor.

Figure 12:
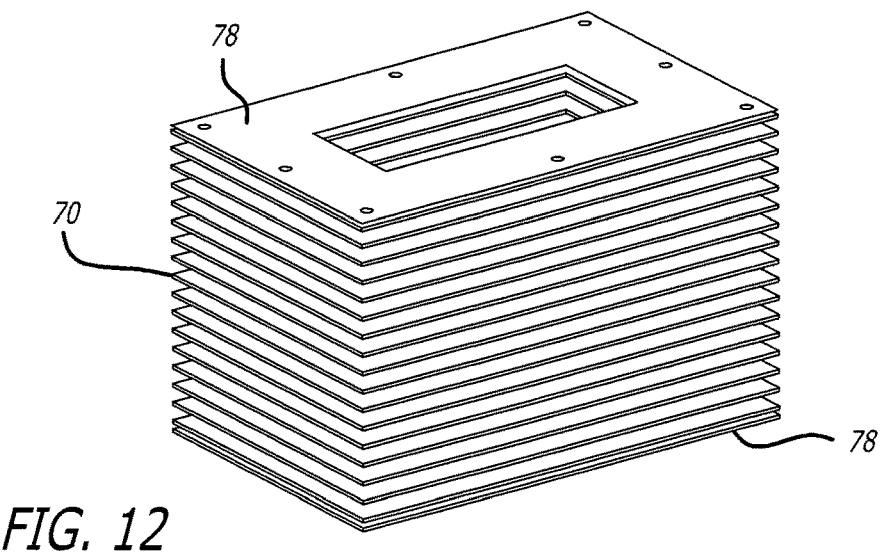
FIG. 12 is a perspective view of compressed air bellows in the vacuum system that are used to move each stowage compartment between their stowed and deployed configurations.

Referring to FIGS. 10 and 12, in a preferred aspect, the vacuum system 38 will utilize two bellows 70 for each stowage compartment 16, 18. Preferably, each bellows is 7 inches wide, 11 inches long, has a contracted depth of a minimum of 7 inches, and is maximally expanded at 38 inches. In a preferred aspect, the bellows are constructed from red, silicone coated fiberglass, 0.022 inches thick, with convolution stiffeners at every other convolution. Optionally, the bellows are constructed from silver, aluminum coated fiberglass, 0.020 inches thick. In a preferred aspect, the bellows incorporate an integrated flange 78 on each end, preferably constructed from 0.0625 inch thick stainless steel material.

In a preferred aspect, the vacuum system plenums 76 are made from welded aluminum tubing or prepreg layup. In another preferred aspect, the vacuum bellows 70 material is preferably fiberglass reinforced red silicone. In another preferred aspect, the tubing or bellows line 74 used in the vacuum system is preferably AS1503 high pressure silicone hose. In other preferred aspects, the vacuum generator 68 is an existing B/E Ecosystems light weight certified component, and the bypass valves 72, 73 are existing Nord Micro® light weight certified components.

Figure 14:
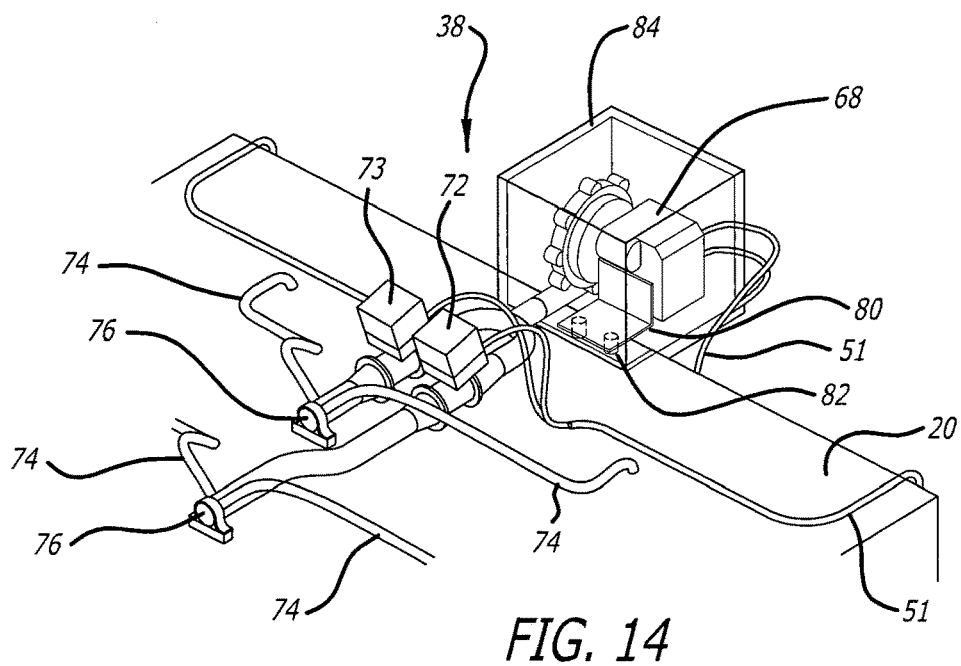
FIG. 14 is a perspective view of the vacuum system of FIG. 10 further including an acoustic isolation box enclosing the vacuum generator.

Now referring to FIG. 14, in a preferred aspect, the aircraft overhead stowage system 10 limits noise generated by the vacuum generator 68 and the bypass valves 72, 73. Preferably, the vacuum generator 68 is attached to the stowage compartment housing 20 via a bracket 80 that incorporates isolation mounts 82. A sound reducing enclosure or acoustic isolation box 84 optionally can be added to further reduce noise levels.

Figure 15A:
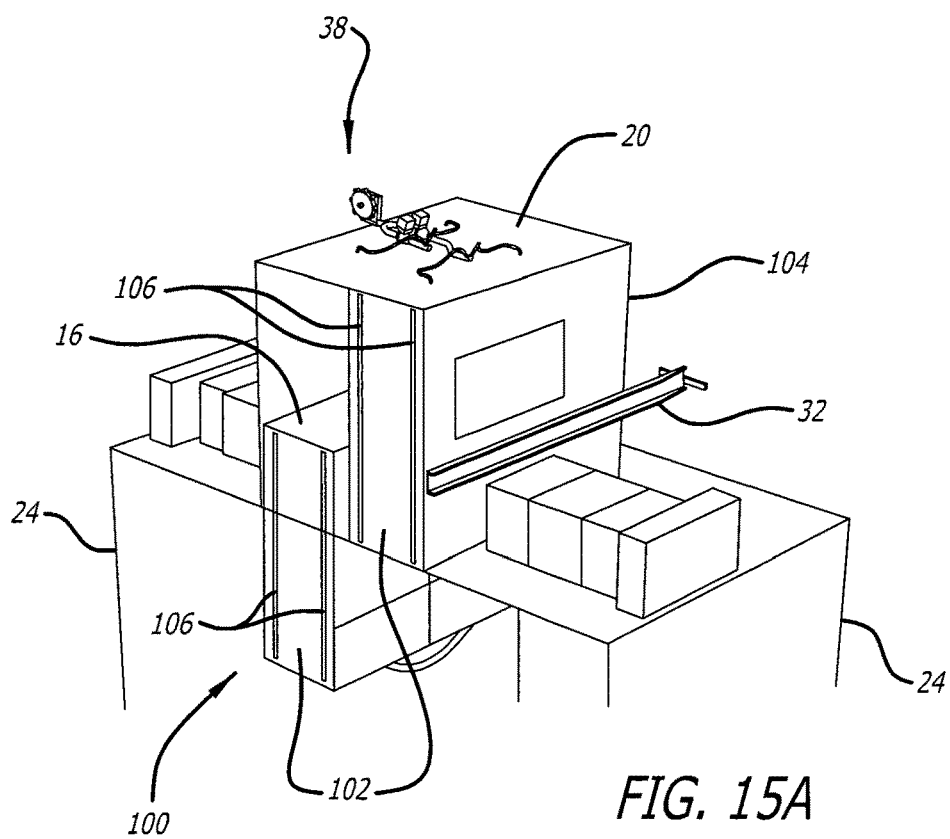
FIG. 15A is a perspective view of the aircraft overhead stowage system as installed above the ceiling of a cross-aisle center galley complex including a linear track rail system used for moving the stowage compartments between their stowed and deployed configurations.
Figure 15B:
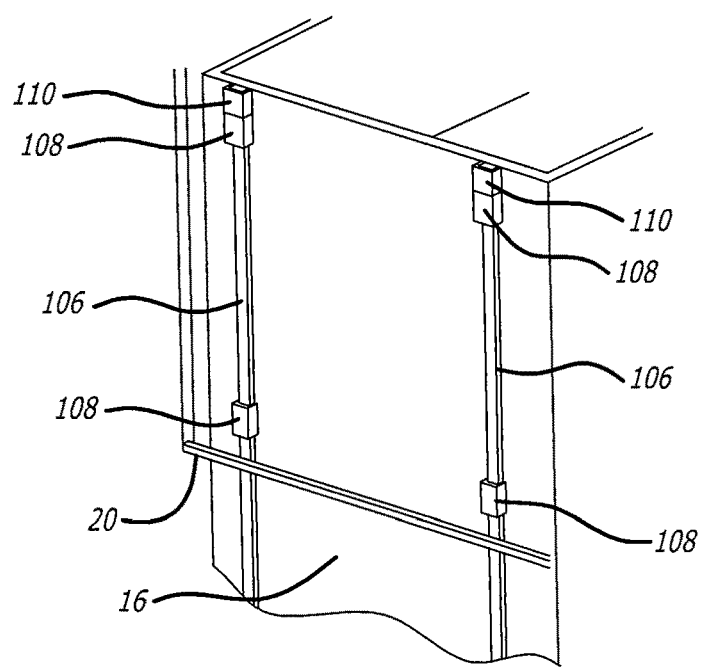
FIG. 15B is an enlarged view of the linear track rail system illustrated in FIG. 15A.

FIGS. 15A and 15B illustrate a preferred embodiment of a linear track rail system 100. As shown in FIG. 15A, the aircraft overhead stowage system 10 further includes a linear track rail system 100 that addresses stress abuse loads and guides and supports the stowage compartments 16, 18 in the raised and lowered positions. Each stowage compartment has a left hand side 102 and a right hand side 104 that include linear track rails 106 connected to each stowage compartment and arranged in a vertical direction for lowering and raising each stowage compartment.

Referring to FIG. 15B, the stowage compartment housing 20 includes equally distributed, low profile rail guides or bearings 108 that are fixed to the stowage compartment housing and guide the linear track rails 106 as the stowage compartments 16, 18 slidably move between their stowed and deployed positions. Preferably, IGUS® rails and bearings are used. Each side (102 and 104) of both stowage compartments preferably has two linear track rails, each spaced 12 inches apart, that each slidably engage with two low profile rail bearings 108 which are preferably vertically spaced 12 inches apart. Both sides (102 and 104) of each stowage compartment also preferably have two rail stops 110 that contact the uppermost rail bearings 108 when the stowage compartment is in its fully deployed position, preventing the stowage compartment from disengaging from the stowage compartment housing.

Figure 16:
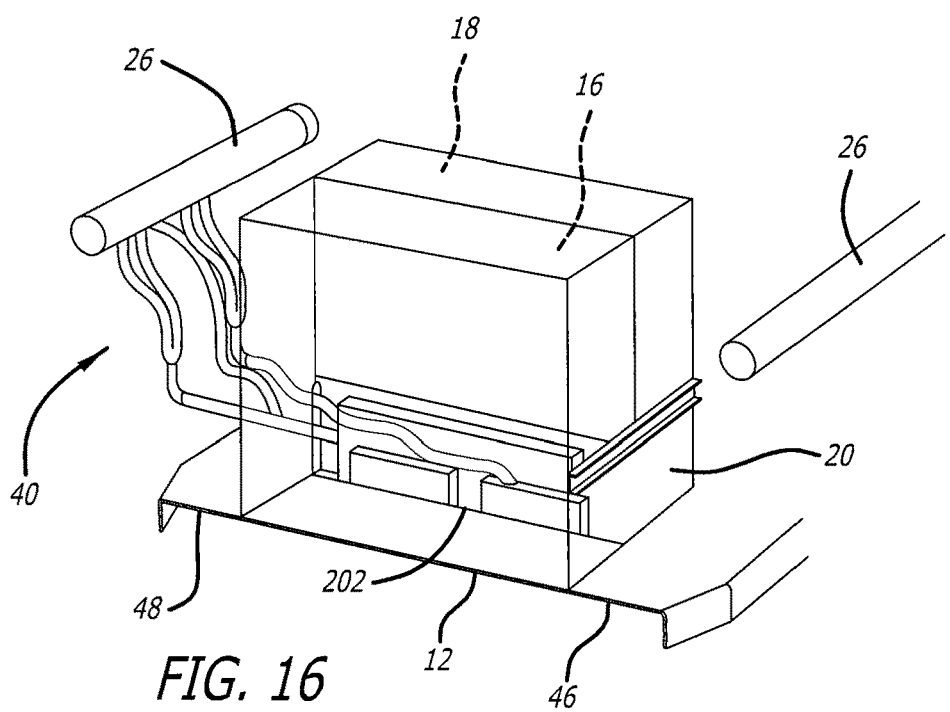
FIG. 16 is a perspective view of the aircraft overhead stowage system including a galley ceiling system disposed between the two stowage compartments, where the front stowage compartment has been removed for clarity of illustration.

FIGS. 16-20 illustrate a preferred embodiment of the galley ceiling system 40. Referring to FIG. 16, the aircraft overhead stowage system 10 further includes a galley ceiling system 40 within the stowage compartment housing 20 that is connected to existing galley or lavatory vents 26 running above the ceiling 12 of the aircraft for venting and for supplying air to the galley 14. The ceiling system 40 includes a drop-down center ceiling system panel 202 disposed between the stowage compartments 16, 18 within the stowage compartment housing 20, a right hand ceiling panel 48, and a left hand ceiling panel 46. The galley ceiling system is preferably shrouded.

Figure 17:
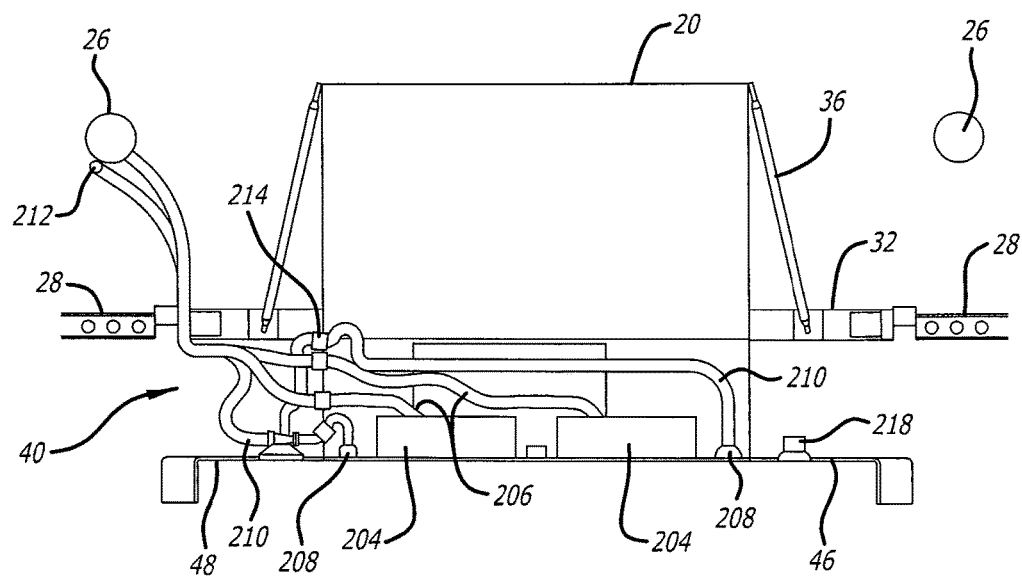
FIG. 17 is a side elevational view of the aircraft overhead stowage system with galley ceiling system illustrated in FIG. 16.

As illustrated in FIG. 17, the ceiling system 40 preferably has two vent grilles or vent plenums 204 attached to the ceiling system panel 202 that are connected via galley venting ducts or hoses 206 to an existing galley or lavatory ventilation duct 26 already extending throughout the aircraft. The vent plenums 204 vent air from the galley complex 14. Also attached to the ceiling system panel adjacent to the vent plenums are gasper nozzles 208 that are connected via gasper air ducts or hoses 210 to an existing air passageway 212. The gasper nozzles allow cabin crew members or passengers in the center galley to control the flow of air to the galley. The galley venting ducts 206 and the gasper air ducts 210 preferably have a quick disconnect duct attachment 214 that allows the ceiling systems panel to be disconnected from the galley or lavatory ventilation duct 26 and air passageway 212. This may be desired, for example, to access a chiller in one of the stowage compartments.

Figure 18:
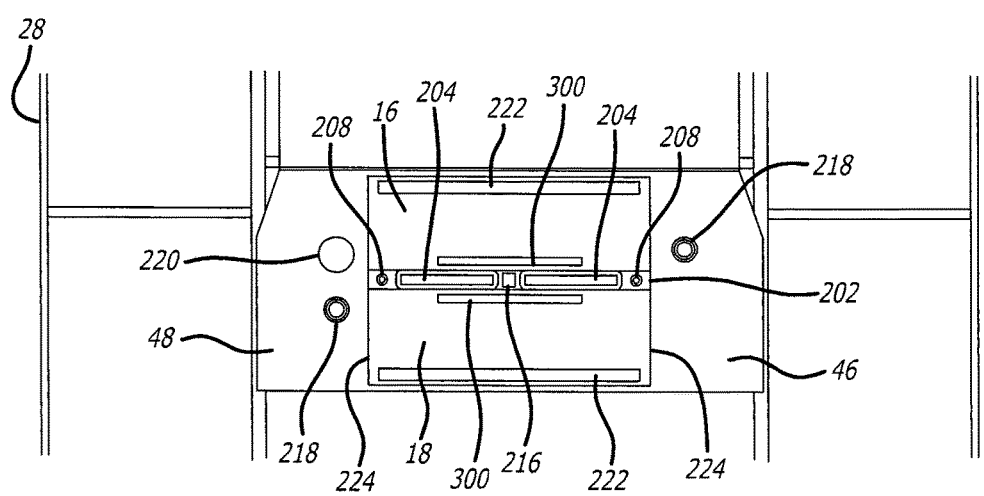
FIG. 18 is a bottom plan view of the aircraft overhead stowage system with galley ceiling system, where the ceiling of the cross-aisle center galley complex has been removed to illustrate the bin support rails.

Now referring to FIG. 18, the galley ceiling system 40 further preferably includes an emergency lighting 216 that is disposed in the ceiling system panel 202 adjacent to the vent plenums 204, preferably opposite the gasper nozzles 208. One or more area lights 218 and speakers 220 may be placed on the ceiling panels 46 or 48. The emergency lighting, area lights, and speakers may be created from salvaged parts. The ceiling system panel also preferably includes LED galley work lights 222 adjacent to both stowage compartments 16, 18 to assist in accessing stowage during the night or when light is otherwise needed.

In a preferred aspect, the vent grilles/plenums 204 are positioned in the center of the ceiling system panel 202 as shown in FIG. 18 to vent the galley 14 due to the placement of the stowage compartments 16, 18 and the intent to provide an FAA-compliant cross aisle width when each compartment is deployed.

In a preferred aspect, seals 224 are provided at all gaps between ceiling panels 202, 46, 48 and stowage compartments 16, 18 for smoke retention, noise reduction and aesthetics. Preferably, the seals are constructed from bulb and blade type flexible silicone material, with a color matching the cabin interfaces. Thus, the stowage compartments can exclude hazardous quantities of smoke or extinguishing agent that may originate in the stowage compartments from entering other occupied areas by providing positive compression sealing when the compartments are in the stowed condition, isolating the compartments from the main cabin environment. Each compartment 16, 18 is enclosed in a separate enclosure to achieve smoke containment. In a preferred aspect, the stowage compartment smoke barrier or closeout seals 224 are preferably silicone blade and bulb extrusions.

Figure 19:
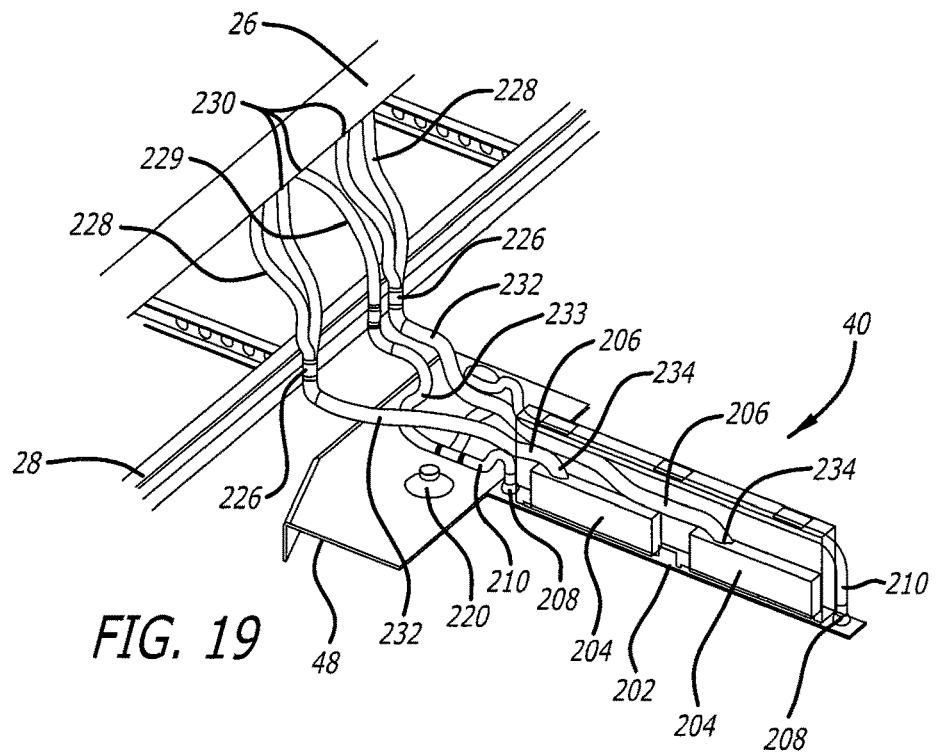
FIG. 19 is a partial perspective view of the galley ceiling system with the stowage compartment housing removed for clarity of illustration.

Referring to FIG. 19, in a preferred aspect, the ceiling system 40 is installed according to the following method. Interface duct plenums 226 are attached to a bin support rail 28 preferably using clamps. Flex hoses 228 (which are sections of vent hoses 206) and flex hose 229 (which is a section of gasper hose 210) are attached to the interface duct plenums 226 and are then connected to available spuds 230 in the existing galley or lavatory ventilation duct or environmental control system (ECS) air ducting interfaces (26). Similarly, additional ceiling mounted flex hoses 232 and 233 integrated onto the right hand ceiling panel 48 are attached to the interface duct plenums 226 and are then connected to available spud interfaces 234 on the stowage compartment housing 20. In this way, the air passageway 212 is connected via the gasper hose (233, 229, 210) to the gasper nozzles 208, and the ventilation or lavatory or ECS duct 26 is connected via the venting hoses (232, 228, 206) to the vent plenums 204.

Figure 20:
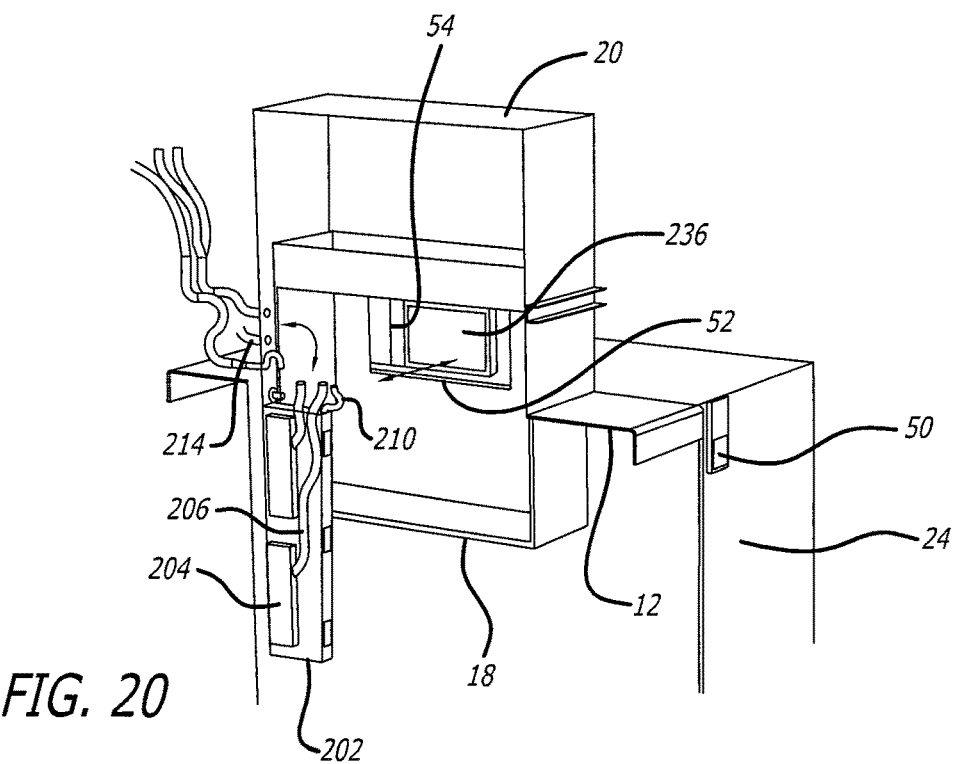
FIG. 20 is a partial perspective view of the aircraft overhead stowage system in which one of the two stowage compartments has been deployed and the galley ceiling system has been disconnected and rotated downward into the cross-aisle center galley complex to provide access to a chiller stored above the ceiling.

As illustrated in FIG. 20, in a preferred aspect, the aircraft overhead stowage system 10 preferably can also stow one or more galley air chillers 236 above the galley ceiling 12. In a preferred aspect, each stowage compartment 16, 18 may include an opening 52 in a side of the stowage compartment that is sized to insert or extract a galley air chiller 236. To extract the chiller, the stowage compartment is lowered into its deployed position until its opening 52 is aligned with the housing opening 54 and the chiller 236. The ceiling systems panel 202 can be hingedly rotated to provide clearance for chiller access by disconnecting the vent hoses 206 and gasper hoses 210 using the quick disconnect duct attachments 214. Then, the chiller can be extracted from its position above the galley ceiling through the walls of the stowage compartment housing 20 and the stowage compartment. A reverse procedure can be used to insert or re-insert the chiller and stow it above the ceiling.

Figure 21:
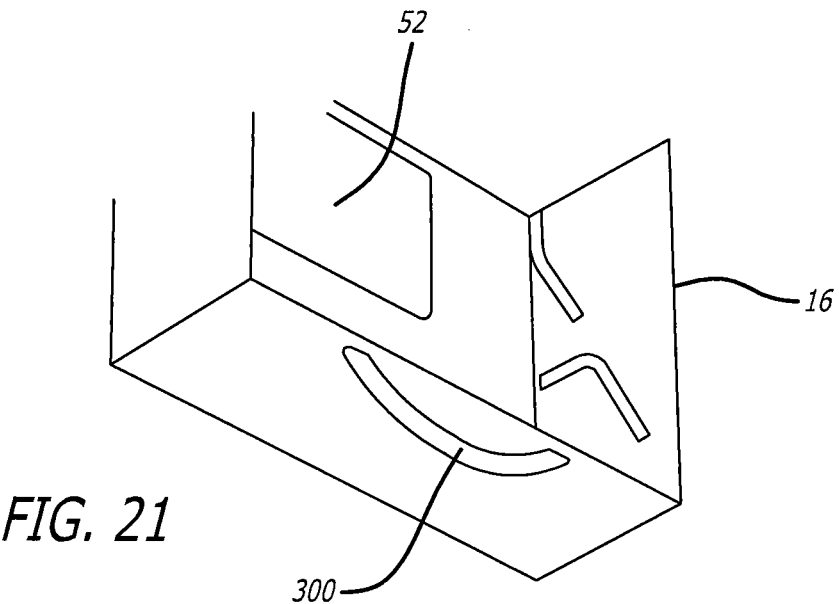
FIG. 21 is a bottom perspective view of a preferred embodiment of a handle for each stowage compartment in the aircraft overhead stowage system.
Figure 22:
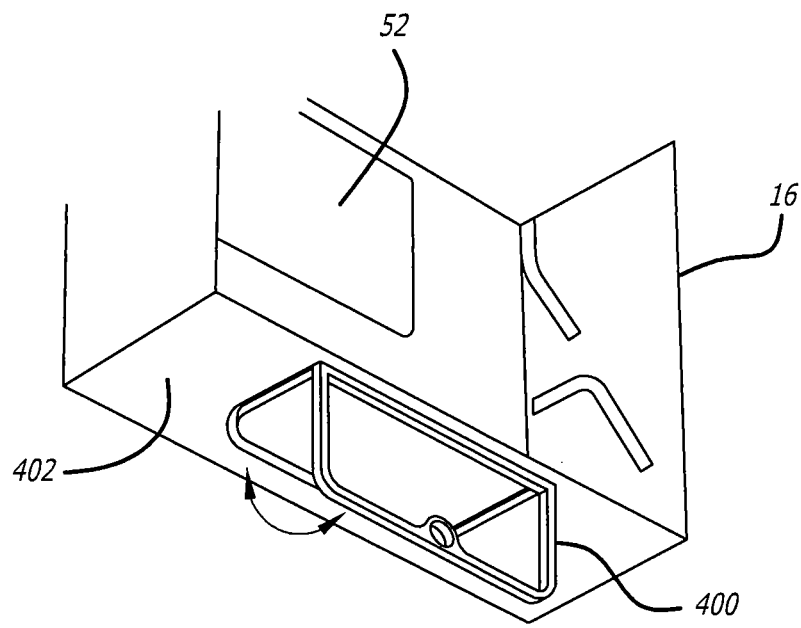
FIG. 22 is a bottom perspective view of an alternate embodiment of a handle for each stowage compartment in the aircraft overhead stowage system.

With reference now to FIGS. 21 and 22, the stowage compartments 16, 18 preferably include handles to enable a cabin crew member or user to manually lower or raise the stowage compartments, for example if the control panel 50 is inoperative or power is otherwise not provided to the aircraft overhead stowage system 10. In one embodiment, as illustrated in FIG. 21, the handles 300 are fixed to the stowage compartments and may be immediately accessible to a user to pull down. Preferably, the handle in this aspect is approximately 77 inches from the aircraft floor. Alternatively, as shown in FIG. 22, the handles 400 may be flush or level with the bottom wall 402 of the stowage compartment such that a user must pull down the handle before lowering the stowage compartment. In this aspect, the handle when in its flushed position is approximately 82 inches from the aircraft floor, and the handle when in its pulled-down position is approximately 71 inches from the aircraft floor. The vertical height of the handles 300, 400 are preferably determined by the width and length of a galley cross aisle curtain header (not shown).

Figure 23A:
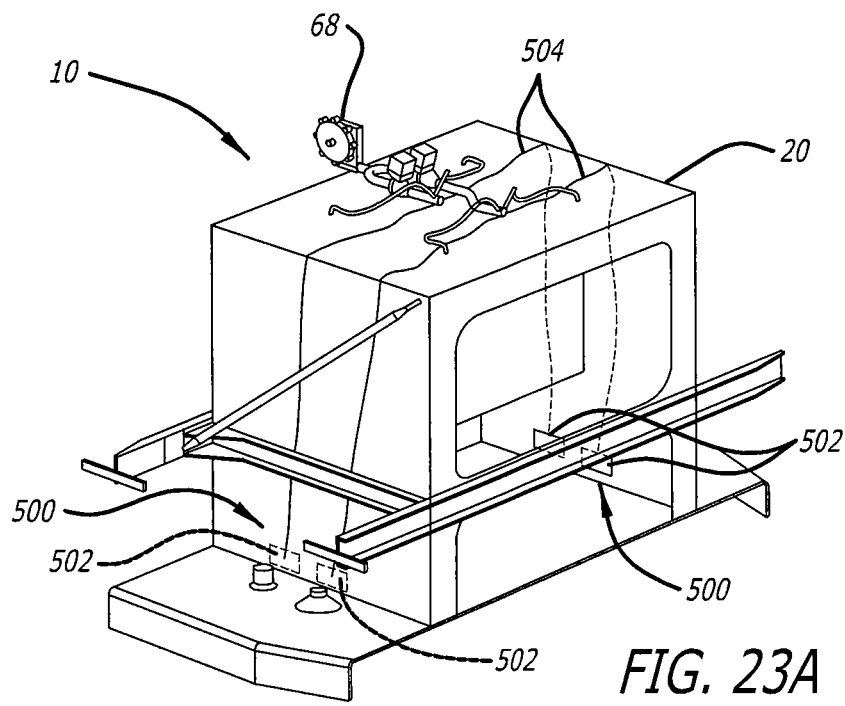
FIG. 23A is a perspective view of the aircraft overhead stowage system including a vacuum-driven latching mechanism for each stowage compartment in which latch strike piston feed lines linked to the vacuum system are illustrated.

FIGS. 23A-25 illustrate a preferred embodiment of a vacuum-driven latching mechanism 500. Referring to FIGS. 23A-23C, the aircraft overhead stowage system 10 preferably includes a vacuum-driven latching mechanism 500 that performs mechanical latching of the individual stowage compartments 16, 18. A pair of latch strike assemblies 502 is preferably attached to the stowage compartment housing 20 on opposite sides of each stowage compartment. The latch strike assemblies are preferably operated by action of the vacuum system 38 via latch strike piston feed lines 504, and also can be operated manually.

Figure 23B:
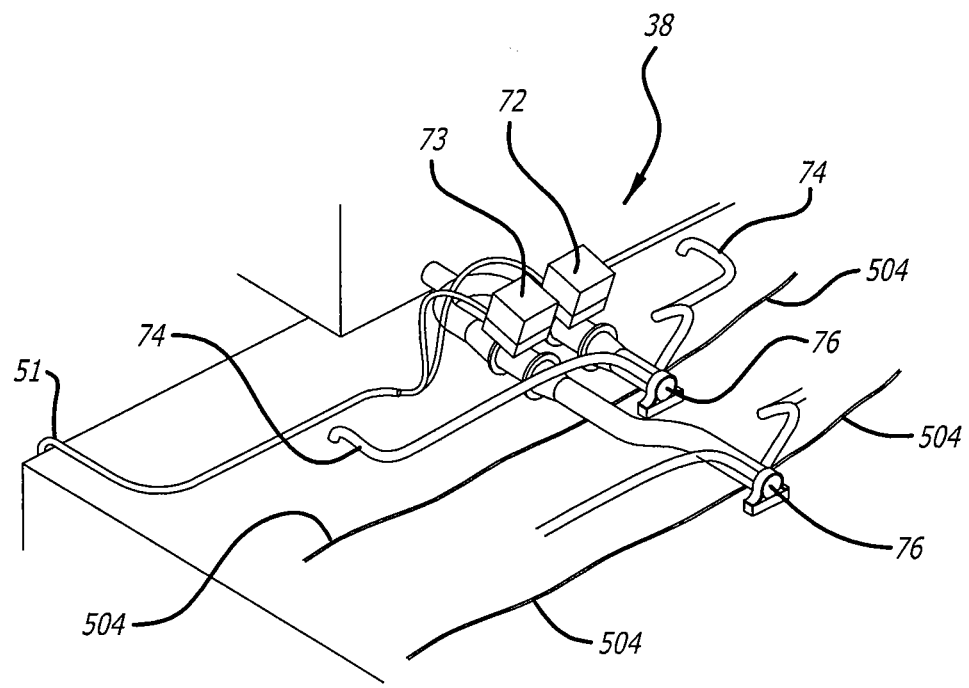
FIG. 23B is a partial perspective view of the aircraft overhead stowage system depicted in FIG. 23A illustrating the vacuum manifolds to which the latch strike piston feed lines are connected.
Figure 23C:
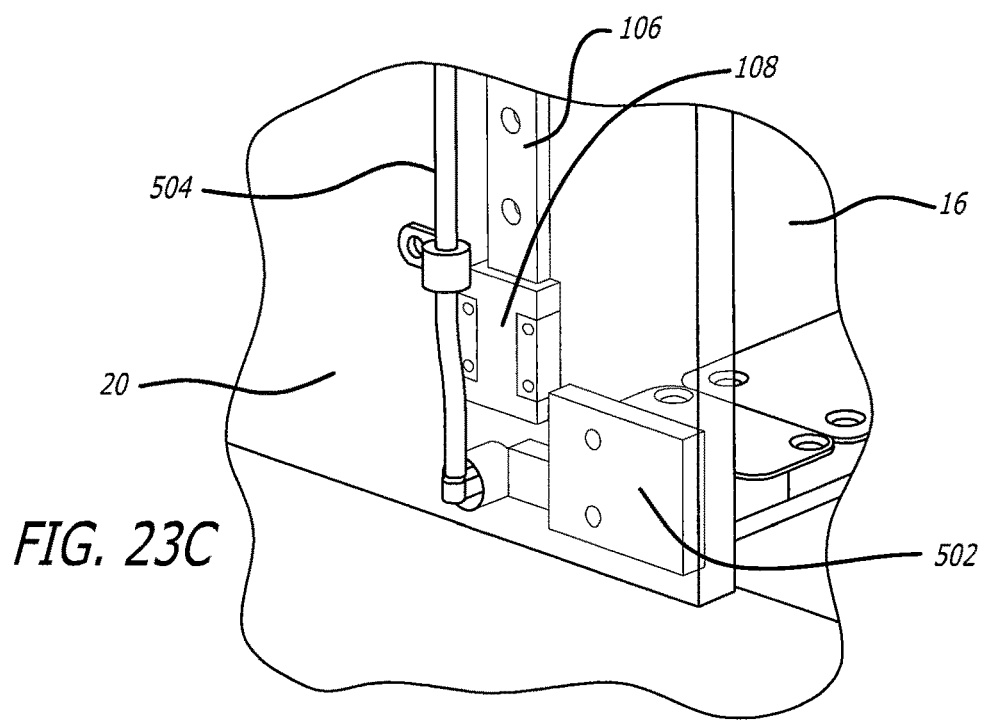
FIG. 23C is a partial rear perspective view of the aircraft overhead stowage system depicted in FIG. 23A illustrating the latch strike piston feed lines being connected to a latch strike assembly for a stowage compartment.
Figure 24:
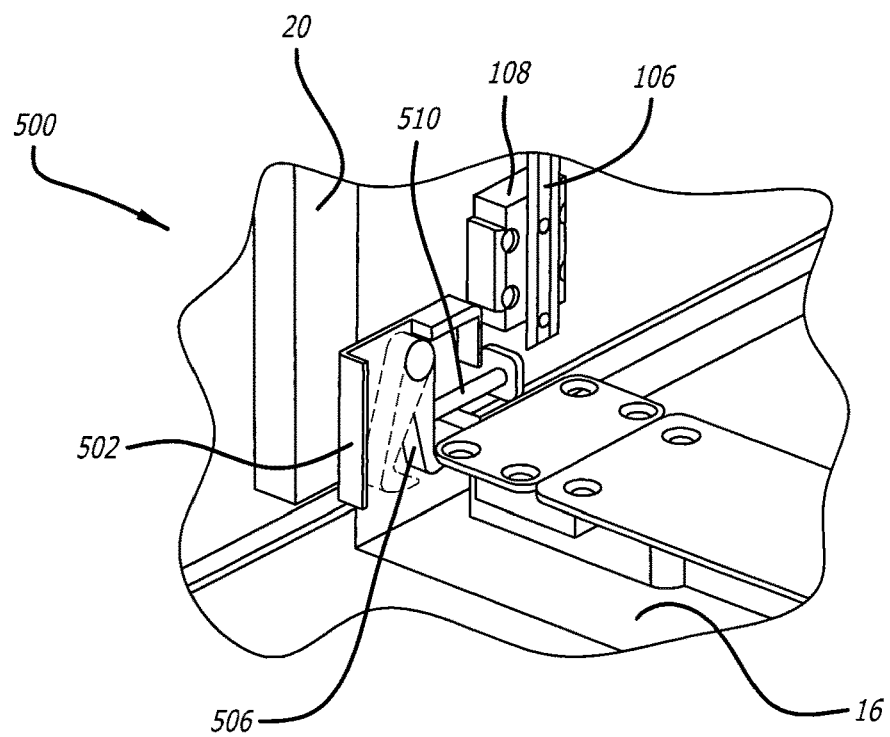
FIG. 24 is a perspective view of the latch strike assembly referenced in FIG. 23C.

Now referring to FIGS. 24 and 25, the latch strike assembly 502 for an individual stowage compartment 16, 18 is attached to the stowage compartment housing 20 and includes a latch strike or locking strike 506, a latch pin 508, and a pressure piston or pressure plunger 510 linked to the vacuum system 38 through latch strike piston feed lines 504 (see FIG. 23). In a preferred aspect, when the vacuum system is initiated to lower or deploy the stowage compartment, the vacuum system activates the pressure piston 510 to disengage the locking strike 506 from the latch pin 508, allowing the stowage compartment to descend. When the vacuum system is initiated to raise or stow the stowage compartment, the stowage compartment ascends until it is in the fully stowed or closed position. At that point, the pressure piston 510 is deactivated and the locking strike 506 re-engages the latch pin 508, locking the stowage compartment in the stowed position. By default, the locking strike engages the latch pin and prevents the stowage compartment from descending. The default locked position of both stowage compartments is beneficial in the event of a possible failure in vacuum generator 68, preventing potential injury from a stowage compartment's descent.

Further referring to FIG. 23B, the vacuum system 38 operates the latch strike assemblies 502. The vacuum generator 68 is connected to the latch strike assemblies via the latch strike piston feed lines 504 connected to the vacuum manifolds 76 along with the bellows lines 74. The latch strike piston feed lines connect to the pressure pistons 510 in the latch strike assemblies. Thus, when the vacuum system is initiated, the vacuum generator supplies a vacuum force through the vacuum manifolds and through the latch strike piston feed lines down to the pressure pistons in the latch strike assemblies 502, thereby operatively engaging or disengaging the locking strike 506.

Figure 26C:
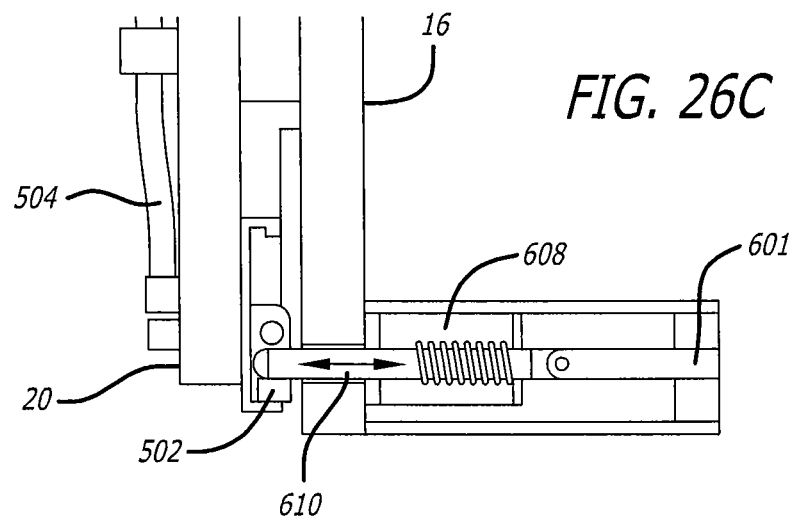
FIG. 26C is a partial side elevational view of the handle of FIG. 26A illustrating the operation of the manual latch assembly with the latch strike assembly for each stowage compartment.

FIGS. 26A-26C illustrate a preferred embodiment of a handle latch mechanism 600 for manually interacting with the latch strike assembly 502. Referring to FIG. 26A, the aircraft overhead stowage system 10 preferably includes a manual latch assembly in the event the vacuum system 38 is inoperative. Specifically, the independent manually operated handle latching mechanism or handle latch mechanism 600 is integrated into the handle 300 (or 400) of each stowage compartment 16, 18. The handle latch mechanism allows for additional back-up latching deployment and manual override capability for the stowage compartment, for example, in the event the vacuum-driven latching mechanism 500 is inoperative due to failure of the vacuum system 38. Additionally, the handle can be used to assist in returning the compartment to the stowed position in the event of a vacuum system failure.

As shown in FIGS. 26B and 26C, in a preferred aspect, the fixed handle 300 has an integrated latch assembly 601 inside the handle that allows a user to lower a stowage compartment 16, 18 manually by pressing a button 604 on the handle to release latch 602. The handle latch mechanism 600 includes a push button 604 that engages a spring mechanism 606 and is connected to a latch bolt assembly 608 via the integrated latch assembly 601. By default, the latch bolt assembly 608 includes a latch bolt 610 that engages the latch strike assembly 502 and prevents the stowage compartment from descending. When the push button on the handle is pressed, the spring mechanism in the handle compresses and causes the latch bolt to disengage from the latch strike assembly, thus releasing the latch and allowing the stowage compartment to manually descend.

In a preferred aspect, the latch mechanisms (500 and 600) are a combination of aluminum and steel components as required for operational strength and efficiency.

Figure 27:
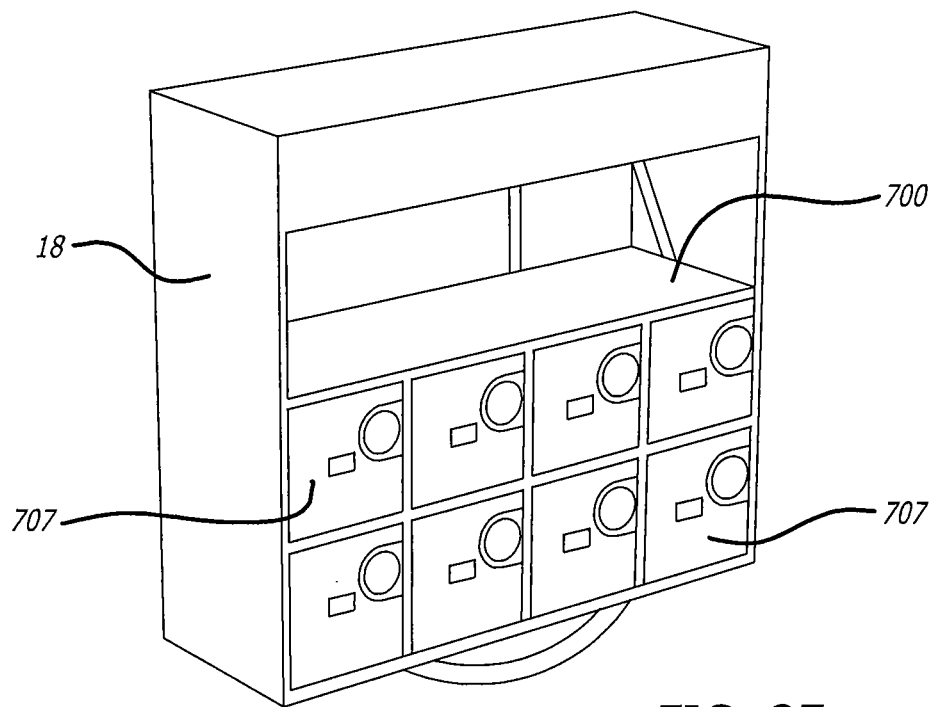
FIG. 27 is a perspective view of a stowage compartment in the aircraft overhead stowage system illustrating one exemplary use for the stowage compartment in which a standard container rack of stowage containers is stored.
Figure 28:
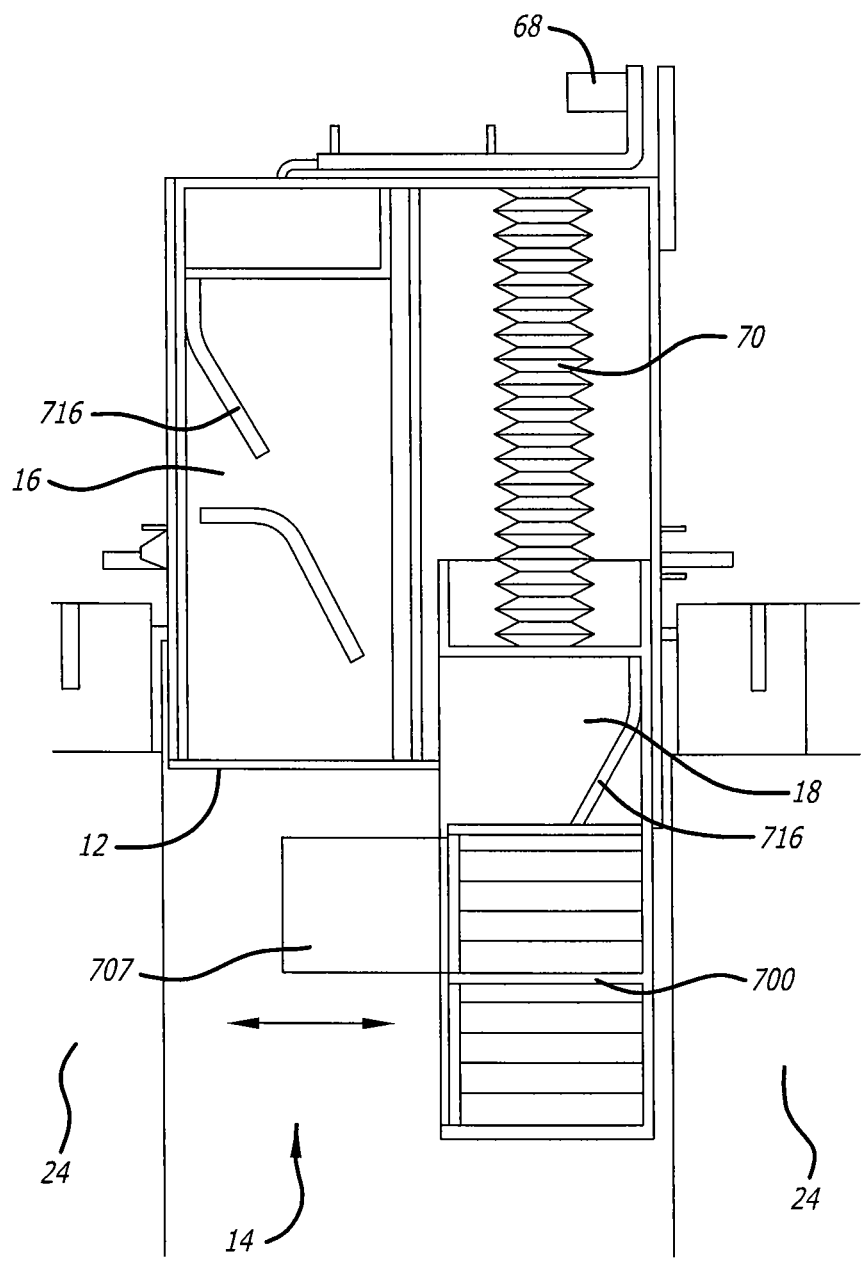
FIG. 28 is a side elevational view of the aircraft overhead stowage system in which the stowage compartment illustrated in FIG. 27 is deployed below the ceiling in the cross-aisle center galley complex for access to the standard container rack of stowage containers.
Figure 29:
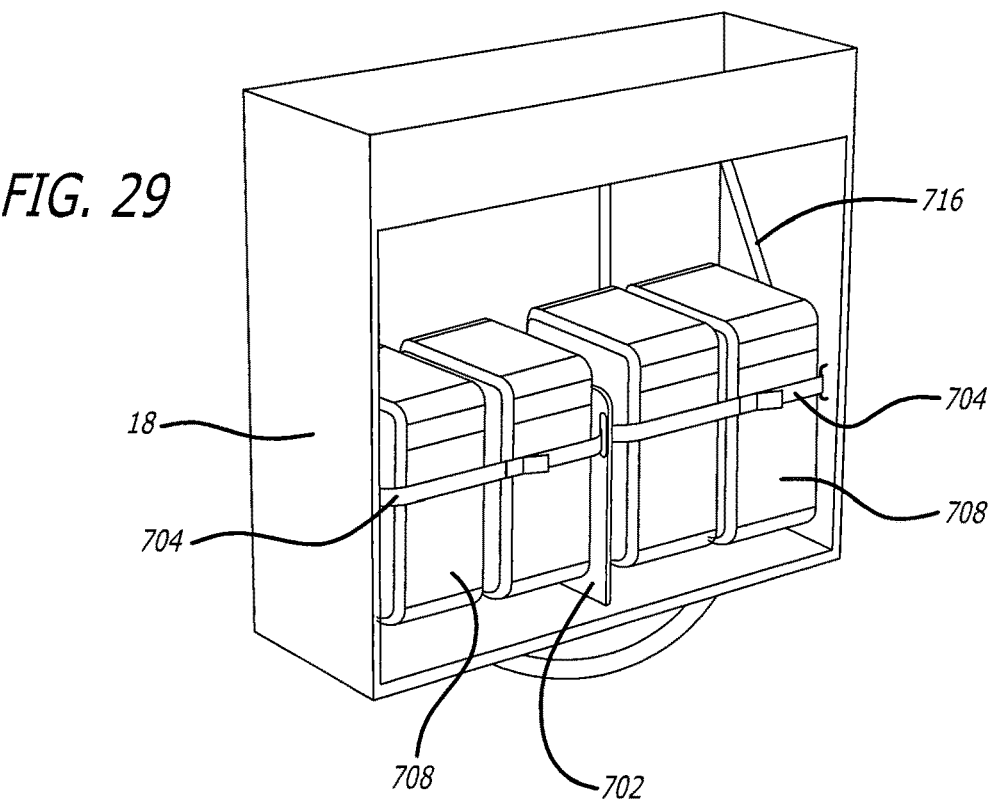
FIG. 29 is a perspective view of a stowage compartment in the aircraft overhead stowage system illustrating another exemplary use for the stowage compartment in which a plurality of carry-on luggage separated by a divider is stored.
Figure 30:
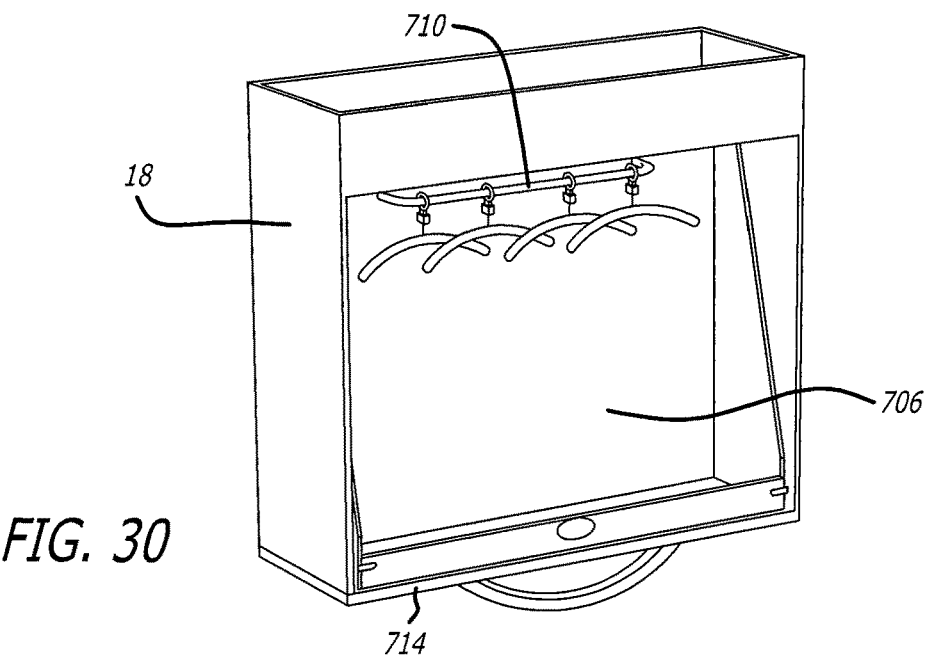
FIG. 30 is a perspective view of a stowage compartment in the aircraft overhead stowage system illustrating a further exemplary use for the stowage compartment in which a retractable extension containing a coat rack is stored.

Referring now to FIGS. 27-33, the aircraft overhead stowage system 10 preferably includes additional removable provisions for storing a variety of items in the stowage compartments. For example, the removable provisions may include a standard container rack 700 as shown in FIG. 27, a divider 702 and strap 704 as shown in FIG. 29, or an extension or shelf 706 as shown in FIG. 30.

As shown in FIGS. 27-28, the standard container rack 700 holds one or more stowage containers 707 and can be removably placed into either stowage compartment (16 or 18). Preferably, a standard container rack can hold eight stowage containers all within a single stowage compartment. When the stowage compartment is in its fully deployed position, as illustrated in FIG. 28, the stowage compartment is preferably 52.5 inches from the aircraft floor, and 29.6 inches from the galley ceiling 12.

With reference to FIG. 29, the stowage compartment 16, 18 can also include a removable divider 702 to separate items such as standard ATA carry-on luggage 708. The stowage compartment can also include straps 704 to hold and support the luggage in the stowage compartment.

Figure 31:
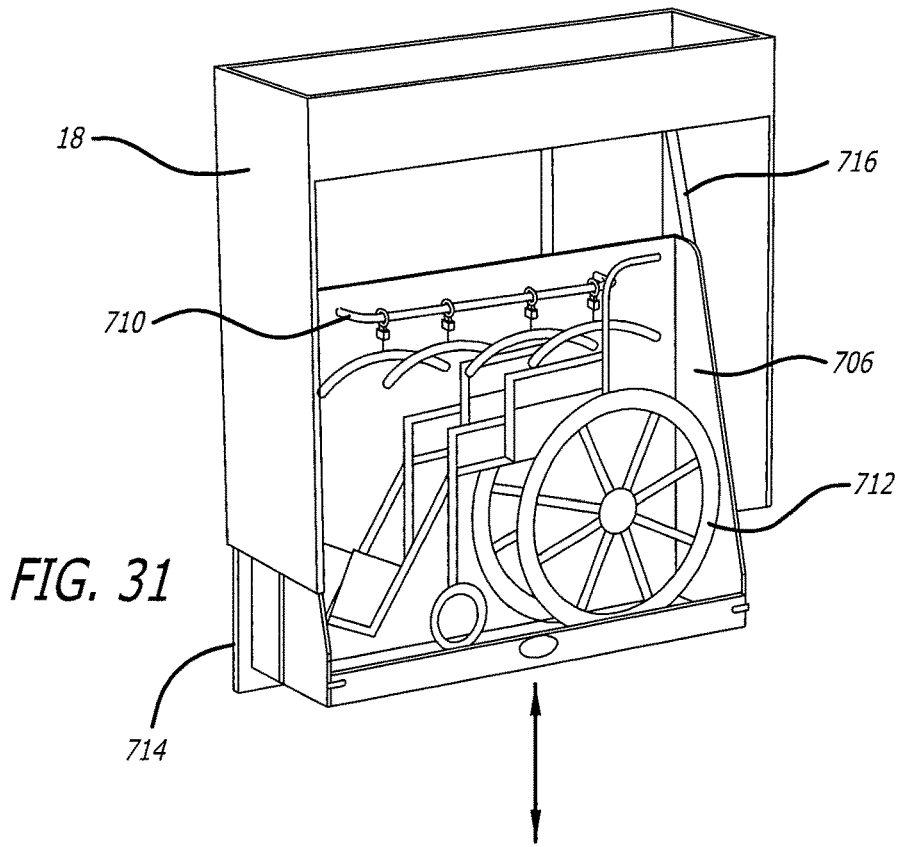
FIG. 31 is a perspective view of the stowage compartment of FIG. 30 in which a wheelchair is also stored and where the retractable extension has been deployed from the stowage compartment to enable access to the coat rack and wheelchair.
Figure 32:
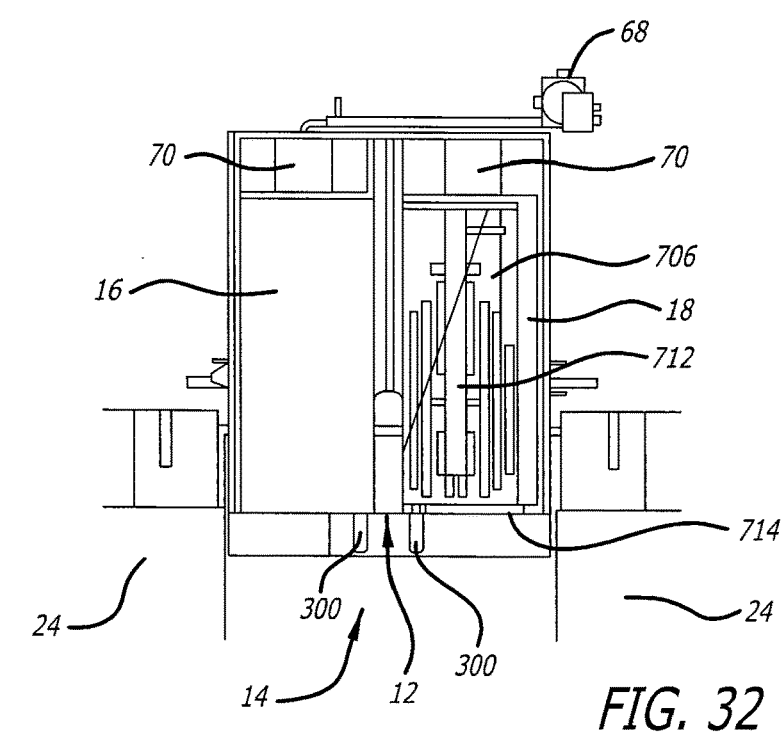
FIG. 32 is a side elevational view of the aircraft overhead stowage system in which the stowage compartment with retractable extension illustrated in FIG. 31 are stowed above the ceiling in the cross-aisle center galley complex.
Figure 33:
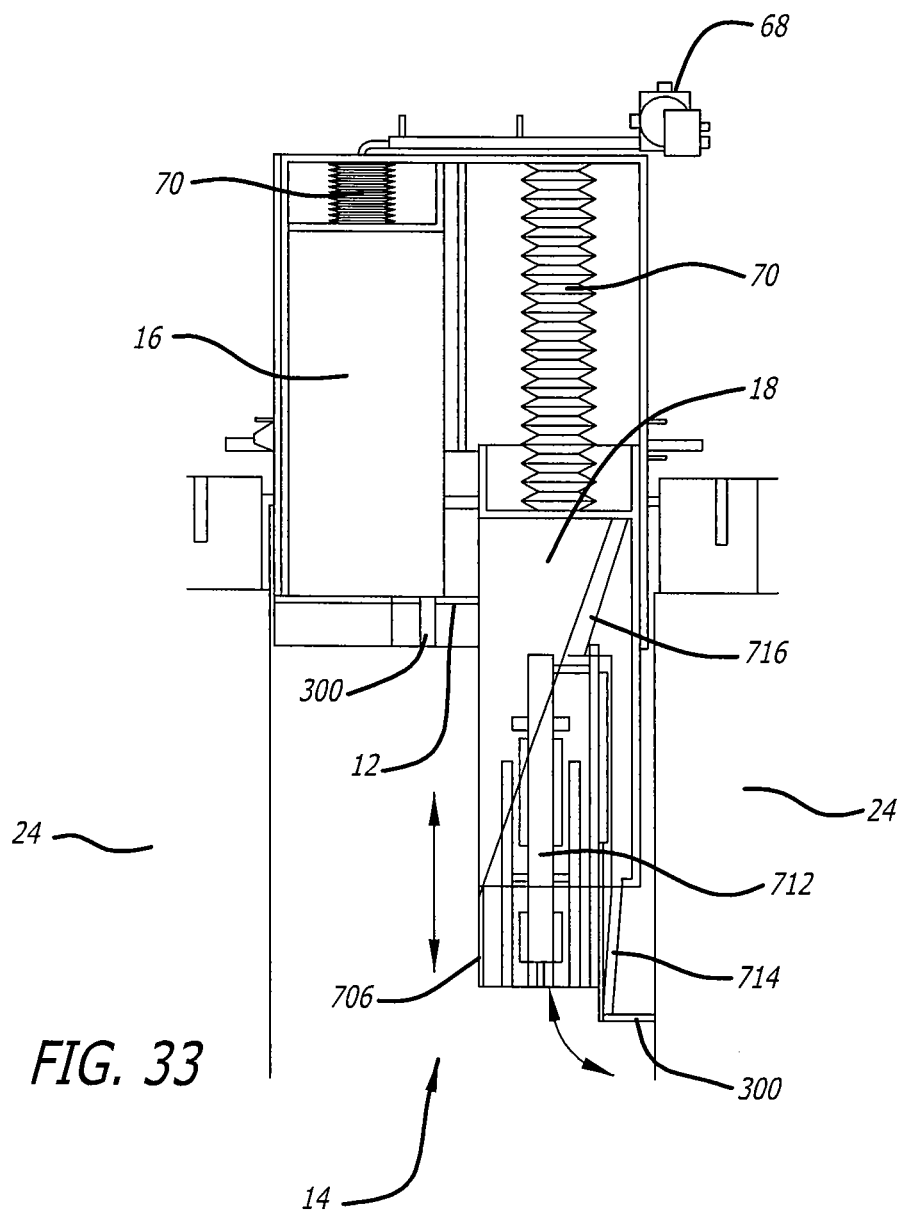
FIG. 33 is a side elevational view of the aircraft overhead stowage system in which the stowage compartment with retractable extension illustrated in FIG. 32 are both deployed below the ceiling in the cross-aisle center galley complex for access to the wheelchair.

FIGS. 30-33 illustrate that the stowage compartment 16, 18 can also include a retractable extension or shelf 706 that can be removably placed in the stowage compartment for holding larger items such as coats or other clothing on racks 710, or wheelchairs 712. The stowage compartment preferably includes a hinged lower panel 714 (on which the handle 300 or 400 is located) that rotatably opens to allow the retractable extension or shelf to move along guide tracks 716 of the stowage compartment down into the galley complex 14 (see FIG. 33). The shelf moves below the stowage compartment until the guide tracks 716 cease and the shelf is suspended in a fully deployed position, as depicted in FIGS. 31 and 33. When the hinged lower panel is rotatably closed, the shelf is pushed along the guide tracks up into the stowage compartment until the shelf is fully stowed in the stowage compartment. The stowage compartment is then raised back above the ceiling 12 until the stowage compartment is fully stowed, as depicted in FIGS. 30 and 32. When the stowage shelf 706 is in its fully deployed position, the distance between the bottom of the stowage compartment and the bottom of the shelf is preferably 12 inches, and the distance from the shelf to the aircraft floor is preferably 41.5 inches.

In a preferred aspect, the construction of the aircraft overhead stowage system 10 uses standard MV fasteners and inserts. In another preferred aspect, the stowage compartments 16, 18 can be lowered quickly to fight fires by opening a pressure relief valve and manually deactivating the retention latch 600 integral to the stowage compartment handle, thus allowing the stowage compartment to be lowered when the vacuum system 38 is inoperative. In another preferred aspect, the stowage compartments and stowage compartment housing 20 are fire resistant and meet conventional flammability requirements for compartment interiors. In another preferred aspect, the aircraft overhead stowage system uses placards or markings to address door access and locking to prohibit or prevent passenger access and operation of the overhead stowage compartments. In another preferred aspect, the arrangement of the tracks 106, flexible features of the bearing guides 108 and the proximity of adjacent cabin elements minimize impact of severe misalignment of a lowered stowage compartment. In another preferred aspect, the stowage compartment provides a FAA-compliant cross aisle width for aircraft safety requirements even in a "fail" condition of the compartment in the lowered position, for example, due to the vacuum system being inoperative.

In a preferred aspect, the aircraft overhead stowage system 10 comes as a fully pre-assembled kit, including a stowage compartment housing 20 with stowage compartments (16 and 18) and a stowage support structure 30, a vacuum system 38 with individual components and wiring, galley work lights 222, a center galley ceiling and systems 40, including one or more galley vent plenums 204, emergency lighting 216, and gasper nozzles 208, and placards and markings. In another preferred aspect, the aircraft overhead stowage system includes right hand and left hand galley ceiling panels (48 and 46) that interface with the stowage compartments and existing ceiling interfaces in the galley complex 14, bin rail support fittings 64 to attach the stowage compartment housing to existing bin rails 28, a control panel 50 for controlling movement of the stowage compartments, a wire harness 51 for the electrical wires connecting the control panel to the vacuum system 38, and fastening hardware for the aircraft overhead stowage system.

In another aspect, the aircraft overhead galley system 10 preferably includes the following components: a stowage compartment assembly including a stowage compartment housing 20, stowage compartments 16 and 18, and stowage support structure 30; a fully functional vacuum system 38 having a vacuum generator 68 (ECO systems), two by-pass valves 72, 73 (Nord Micro), plenums (vacuum manifolds 76), hoses 74, and bellows 70 (IBC inc.); latch and strike components (500 and 600), a linear track system 100 (IGUS®), a control panel 50, a center ceiling element 40 with galley ventilation grilles/plenums 204 and functional gasper air and lighting components; galley work/area lights 222 (B/E Holbrook); a telescoping wheelchair stowage shelf 712, and right hand and left hand galley ceiling panels 48 and 46.

Referring to FIG. 34, in a preferred aspect, the aircraft overhead stowage system 10 can be installed into the ceiling of an existing cross-aisle galley complex 14 on an aircraft according to the following process 800. Previously existing galley cross aisle ceiling and systems elements 40, including the galley vents, emergency lighting, and gasper nozzles are first removed (805). Optionally, if an existing aircraft overhead stowage system is currently in place (810), the existing aircraft overhead stowage system is also removed (815). Bin rail attachment fittings 64 are installed onto the bin rails 28 above the galley ceiling (820). Then, the stowage compartment housing 20, stowage compartments 16, 18, and support structure assembly 30 are positioned between the galleys 24 above the ceiling 12 (825) and raised into place so that the support structure 30 interfaces and aligns with the bin rail attachment fittings 64 and are attached using bolts 66, nuts, and washers (830). Air conditioning side wire harnesses and the control panel 50 are installed into a selected location and electrical interfaces (e.g. wire harness 51) are connected to power the vacuum system 38 (835). The right hand cross aisle ceiling assembly (including right hand ceiling panel 48 and attached venting hoses 232, 228, 206 and gasper hoses 233, 229, 210) is installed using the same interface as the removed previously existing panel (840). Then, aircraft side systems interfaces (the galley vent plenums 204, emergency lighting 216, gaspers 208) are attached to the new center ceiling panel 202 (845). The left hand cross aisle ceiling assembly (including left hand panel 46) is next installed using the same interface as the removed previously existing panel (850). Finally, remote placards are installed, the system is functionally tested, and the stowage compartments' operation and alignment is validated (855).

Installation of the aircraft overhead stowage system 10 can be installed without impact to existing galley complexes 14, and can be installed with the galleys 24 in position. The existing galley complex support structure 30 is not impacted, and existing overhead duct systems 26 (galley/lavatory vent and ECS) are not affected.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An aircraft overhead stowage system for a cross-aisle galley complex, the system comprising:
a stowage compartment housing disposed above a ceiling of a cross-aisle galley complex, the stowage compartment housing being supported above the ceiling by a stowage support structure;
a first stowage compartment and a second stowage compartment each movably engaged with and disposed inside the stowage compartment housing, each stowage compartment movable between a stowed position and a deployed position relative to the stowage compartment housing;
a vacuum system including:
a vacuum generator that creates a vacuum force, the vacuum generator mounted on the stowage compartment housing; and
a plurality of vacuum bellows connected to each stowage compartment and in fluid communication with the vacuum generator, wherein each of the vacuum bellows contracts in response to a negative pressure caused by the vacuum force, and wherein each of the vacuum bellows expands in response to a venting of the negative pressure caused by the vacuum force;
a control panel in electrical communication with the vacuum generator, wherein the control panel is configured to activate the vacuum system to move one of the first stowage compartment and the second stowage compartment between the stowed position and the deployed position;

a galley ceiling system including a ceiling systems panel positioned on the ceiling of the galley complex between the first stowage compartment and the second stowage compartment;

a vacuum-driven latching mechanism including a latch strike assembly connected to the first stowage compartment, each latch strike assembly including a latch pin, a locking strike that removably engages the latch pin, and a pressure piston in fluid communication with the vacuum generator;

wherein the locking strike is configured to prevent the first stowage compartment from moving into the deployed position while the locking strike engages the latch pin; and wherein the pressure piston is configured to disengage the locking strike from the latch pin in response to activation of the vacuum system by the control panel to allow the first stowage compartment to move into the deployed position.

2. The aircraft overhead stowage system of claim 1, wherein the stowage support structure comprises a plurality of C-shaped extrusions, a plurality of lateral channels connected orthogonally to the C-shaped extrusions using gussets, a plurality of tie rods that connect the stowage compartment housing to one of the C-shaped extrusions, a plurality of bin support rail fittings configured to be placed on a plurality of bin support rails, and a plurality of clevis fittings each having a bolt that connects each bin support rail to each C-shaped extrusion.

3. The aircraft overhead stowage system of claim 1, further comprising a retractable extension removably attached to at least one of the first stowage compartment or the second stowage compartment.

4. The aircraft overhead stowage system of claim 1, further comprising a linear track rail system, wherein each stowage compartment includes a pair of linear track rails connected to a side of the stowage compartment for moving each stowage compartment between the stowed position and the deployed position; wherein the stowage compartment housing includes low profile rail bearings fixed to the stowage compartment housing that slidably engage the linear track rails of each stowage compartment; and wherein the low profile rail bearings guide movement of each stowage compartment between the stowed position and the deployed position.

5. The aircraft overhead stowage system of claim 1, further comprising a handle positioned on a bottom side of each stowage compartment for pulling down each stowage compartment.

6. The aircraft overhead stowage system of claim 1, wherein the vacuum system further comprises a plurality of bypass valves in fluid communication with the vacuum generator and with each of the vacuum bellows, wherein the control panel is electrically connected to each bypass valve, and wherein each bypass valve is selectively configured to prevent the vacuum force from contacting the vacuum bellows in response to an electrical signal transmitted by the control panel.

7. The aircraft overhead stowage system of claim 1, wherein the control panel is positioned accessibly to a user on an aisle galley in the galley complex.

8. The aircraft overhead stowage system of claim 1, wherein the galley ceiling system comprises:

a vent plenum disposed on the ceiling systems panel that is in fluid communication with a ventilation duct for venting the galley complex;

a gasper nozzle positioned on the ceiling systems panel adjacent to the vent plenum that is in fluid communication with an air passageway for supplying air to the galley complex;

an emergency lighting positioned on the ceiling systems panel adjacent to the vent plenum opposite the gasper nozzle; and a plurality of galley work lights positioned on the ceiling systems panel adjacent to the first stowage compartment and to the second stowage compartment.

9. The aircraft overhead stowage system of claim 1, wherein the ceiling systems panel is hingedly rotatable to provide access to a chiller disposed above the ceiling of the galley complex.

10. The aircraft overhead stowage system of claim 1, wherein isolation mounts are connected to the stowage compartment housing, and wherein the vacuum generator is attached to the isolation mounts using a bracket to reduce generation of noise by the vacuum generator.

11. An aircraft overhead stowage system for a cross-aisle galley complex, the system comprising:

a stowage compartment housing disposed above a ceiling of a cross-aisle galley complex, the stowage compartment housing being supported above the ceiling by a stowage support structure;

a first stowage compartment and a second stowage compartment each movably engaged with and disposed inside the stowage compartment housing, each stowage compartment movable between a stowed position and a deployed position relative to the stowage compartment housing;

a vacuum system including:
  a vacuum generator that creates a vacuum force, the vacuum generator mounted on the stowage compartment housing; and
  a plurality of vacuum bellows connected to each stowage compartment and in fluid communication with the vacuum generator, wherein each of the vacuum bellows contracts in response to a negative pressure caused by the vacuum force, and wherein each of the vacuum bellows expands in response to a venting of the negative pressure caused by the vacuum force;

a control panel in electrical communication with the vacuum generator, wherein the control panel is configured to activate the vacuum system to move one of the first stowage compartment and the second stowage compartment between the stowed position and the deployed position;

a galley ceiling system including a ceiling systems panel positioned on the ceiling of the galley complex between the first stowage compartment and the second stowage compartment;

a handle positioned on a bottom side of each stowage compartment for pulling down each stowage compartment; and a manually-operated handle latch mechanism inside the handle of each stowage compartment, the handle latch mechanism including:
  a latch connected to the first stowage compartment;
  a latch bolt assembly including a latch bolt configured to engage the latch to prevent the stowage compartment from descending into the deployed position;
  a spring mechanism inside the handle connecting to the latch bolt assembly; and a push button disposed on the handle engaging the spring mechanism;

wherein the push button is configured to compress the spring mechanism when pressed, thereby disengaging the latch bolt from the latch and allowing the stowage compartment to move into the deployed position; and wherein the push button is configured upon release to cause the spring mechanism to expand, thereby re-engaging the latch bolt with the latch and locking the stowage compartment in the stowed position.

12. An aircraft overhead stowage system for a cross-aisle galley complex, the system comprising:

a stowage compartment housing disposed above a ceiling of a cross-aisle galley complex, the stowage compartment housing being supported above the ceiling by a stowage support structure;

a first stowage compartment and a second stowage compartment each movably engaged with and disposed inside the stowage compartment housing, each stowage compartment movable between a stowed position and a deployed position relative to the stowage compartment housing;

a vacuum system including:
 a vacuum generator that creates a vacuum force, the vacuum generator mounted on the stowage compartment housing;
 a plurality of vacuum bellows connected to each stowage compartment and in fluid communication with the vacuum generator, wherein each of the vacuum bellows contracts in response to a negative pressure caused by the vacuum force, and wherein each of the vacuum bellows expands in response to a venting of the negative pressure caused by the vacuum force; and
 a plurality of bypass valves in fluid communication with the vacuum generator and with each of the vacuum bellows;

a control panel in electrical communication with the vacuum generator, wherein the control panel is configured to activate the vacuum system to move one of the first stowage compartment and the second stowage compartment between the stowed position and the deployed position, wherein the control panel is electrically connected to each bypass valve, and wherein each bypass valve is selectively configured to prevent the vacuum force from contacting the vacuum bellows in response to an electrical signal transmitted by the control panel;

a galley ceiling system including a ceiling systems panel positioned on the ceiling of the galley complex between the first stowage compartment and the second stowage compartment;

a vacuum-driven latching mechanism including a latch strike assembly connected to the first stowage compartment, each latch strike assembly including a latch pin, a locking strike that removably engages the latch pin, and a pressure piston in fluid communication with the vacuum generator;

wherein the locking strike is configured to prevent the first stowage compartment from moving into the deployed position while the locking strike engages the latch pin; and wherein the pressure piston is configured to disengage the locking strike from the latch pin in response to activation of the vacuum system by the control panel to allow the first stowage compartment to move into the deployed position.

13. The aircraft overhead stowage system of claim 12, further comprising a linear track rail system, wherein each stowage compartment includes a pair of linear track rails connected to a side of the stowage compartment for moving each stowage compartment between the stowed position and the deployed position; wherein the stowage compartment housing includes low profile rail bearings fixed to the stowage compartment housing that slidably engage the linear track rails of each stowage compartment; and wherein the low profile rail bearings guide movement of each stowage compartment between the stowed position and the deployed position.

14. The aircraft overhead stowage system of claim 12, wherein the galley ceiling system comprises:

a vent plenum disposed on the ceiling systems panel that is in fluid communication with a ventilation duct for venting the galley complex;

a gasper nozzle positioned on the ceiling systems panel adjacent to the vent plenum that is in fluid communication with an air passageway for supplying air to the galley complex;

an emergency lighting positioned on the ceiling systems panel adjacent to the vent plenum opposite the gasper nozzle; and a plurality of galley work lights positioned on the ceiling systems panel adjacent to the first stowage compartment and to the second stowage compartment.

15. The aircraft overhead stowage system of claim 12, wherein the ceiling systems panel is hingedly rotatable to provide access to a chiller disposed above the ceiling of the galley complex.

* * * * *